US012763840B2

(12) United States Patent
Ghanbarinejad et al.

(10) Patent No.: US 12,763,840 B2
(45) Date of Patent: Oct. 13, 2026

(54) COMMUNICATING BASED ON QUASI-COLLOCATION PROPERTIES

(71) Applicant: Lenovo (Singapore) Pte. Ltd., New Tech Park (SG)

(72) Inventors: Majid Ghanbarinejad, Chicago, IL (US); Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 18/553,656

(22) PCT Filed: Mar. 31, 2022

(86) PCT No.: PCT/IB2022/053052

§ 371 (c)(1),
(2) Date: Oct. 2, 2023

(87) PCT Pub. No.: WO2022/208455

PCT Pub. Date: Oct. 6, 2022

(65) Prior Publication Data

US 2024/0187080 A1 Jun. 6, 2024

Related U.S. Application Data

(60) Provisional application No. 63/170,263, filed on Apr. 2, 2021.

(51) Int. Cl.

*H04B 7/06* (2006.01)
*H04L 5/00* (2006.01)
*H04W 84/04* (2009.01)

(52) U.S. Cl.

CPC ....... *H04B 7/06968* (2023.05); *H04L 5/0048* (2013.01); *H04W 84/047* (2013.01)

(58) Field of Classification Search

CPC ................ H04B 7/06968; H04B 7/088; H04B 7/15542; H04L 5/0048; H04L 5/0023;
(Continued)

(56) References Cited

U.S. PATENT DOCUMENTS

2020/0052769 A1* 2/2020 Cirik .................. H04B 7/06964
2020/0389883 A1* 12/2020 Faxér .................... H04L 5/0053
(Continued)

FOREIGN PATENT DOCUMENTS

CN 111901003 A 11/2020

OTHER PUBLICATIONS

"Enhancements for simultaneous operation of child and parent links" 3GPP TSG RAN WG1 #103-e, Oct. 26-Nov. 13, 2020 (R1-2008859) (Year: 2020).*
(Continued)

*Primary Examiner* — Sun Jong Kim
(74) *Attorney, Agent, or Firm* — Kunzler Needham & Hilton; Bruce R. Needham

(57) ABSTRACT

Apparatuses, methods, and systems are disclosed for communicating based on quasi-collocation properties. One method includes receiving, at a first wireless communication node, a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. The method includes determining whether the second functional entity performs the second communication based in part on the control message.

20 Claims, 24 Drawing Sheets

(58) Field of Classification Search
CPC ..... H04L 5/005; H04L 5/0051; H04L 5/0053; H04L 5/0055; H04L 5/0057; H04L 5/0094; H04W 84/047; H04W 72/231; H04W 72/232
See application file for complete search history.

(56) References Cited

U.S. PATENT DOCUMENTS

| | | | | |
|---|---|---|---|---|
| 2021/0185694 | A1* | 6/2021 | Hua | H04W 24/08 |
| 2021/0298064 | A1* | 9/2021 | Luo | H04W 72/23 |
| 2022/0182160 | A1* | 6/2022 | Su | H04B 17/309 |

OTHER PUBLICATIONS

PCT/IB2022/053052, "International Search Report and the Written Opinion of the International Searching Authority, or the Declaration", International Searching Authority, Jun. 23, 2022, pp. 1-85.
3GPP, "RAN1 Chairman's Notes", 3GPP TSG RAN WG1 Meeting #103-e, Oct. 26-Nov. 13, 2020, pp. 1-108.
3GPP, "RAN1 Chairman's Notes", 3GPP TSG RAN WG1 Meeting #104-e, Jan. 25-Feb. 5, 2021, pp. 1-57.
ZTE et al., "Enhancements for simultaneous operation of child and parent links", 3GPP TSG RAN WG1 #103-e R1-2008859, Oct. 26-Nov. 13, 2020, pp. 1-7.
Qualcomm, "New WID on Enhancements to Integrated Access and Backhaul", 3GPP TSG RAN Meeting #88e RP-201293, Jun. 29-Jul. 3, 2020, pp. 1-5.
3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.
3GPP, "3rd Generation Partnership Project; Technical Specification Group Radio Access Network; NR; Physical channels and modulation (Release 16)", 3GPP TS 38.211 V16.4.0, Dec. 2020, pp. 1-133.
3GPP, "3rd Generation Partnership Project; Technical Specification Group Radio Access Network; NR; Multiplexing and channel coding (Release 16)", 3GPP TS 38.212 V16.4.0, Dec. 2020, pp. 1-152.
3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.
3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
3GPP, "3rd Generation Partnership Project; Technical Specification Group Radio Access Network; NR; Physical layer measurements (Release 16)", 3GPP TS 38.215 V16.4.0, Dec. 2020, pp. 1-25.
3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

COMMUNICATING BASED ON QUASI-COLLOCATION PROPERTIES

CROSS-REFERENCE TO RELATED APPLICATIONS

This application claims priority to U.S. Patent Application Ser. No. 63/170,263 entitled "APPARATUSES, METHODS, AND SYSTEMS FOR CSI ENHANCEMENT AND BEAM MANAGEMENT IN INTEGRATED ACCESS AND BACKHAUL" and filed on Apr. 2, 2021 for Majid Ghanbarinejad et al., which is incorporated herein by reference in its entirety.

FIELD

The subject matter disclosed herein relates generally to wireless communications and more particularly relates to beam management with enhanced duplexing in wireless communication networks.

BACKGROUND

In certain wireless communications networks, integrated access and backhaul ("IAB") systems may be used. In such networks, the IAB system may have inefficient beam usage and/or channel state information acquisition.

BRIEF SUMMARY

Methods for communicating based on quasi-collocation properties are disclosed. Apparatuses and systems also perform the functions of the methods. One embodiment of a method includes receiving, at a first wireless communication node, a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. In some embodiments, the method includes determining whether the second functional entity performs the second communication based in part on the control message.

One apparatus for communicating based on quasi-collocation properties includes a first wireless communication node. In some embodiments, the apparatus includes a receiver that receives a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. In various embodiments, the apparatus includes a processor that determines whether the second functional entity performs the second communication based in part on the control message.

Another embodiment of a method for communicating based on quasi-collocation properties includes receiving, at an integrated access and backhaul (IAB) node, a medium access control (MAC) control element (CE) message from a parent node. The MAC CE message includes a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception. In various embodiments, the method includes determining whether the IAB-DU performs the second transmission or the second reception based in part on: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof: or some combination thereof.

Another apparatus for communicating based on quasi-collocation properties includes an integrated access and backhaul (IAB) node. In some embodiments, the apparatus includes a receiver that receives a medium access control (MAC) control element (CE) message from a parent node. The MAC CE message includes a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception. In various embodiments, the apparatus includes a processor that determines whether the IAB-DU performs the second transmission or the second reception based in part on the processor: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof: or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
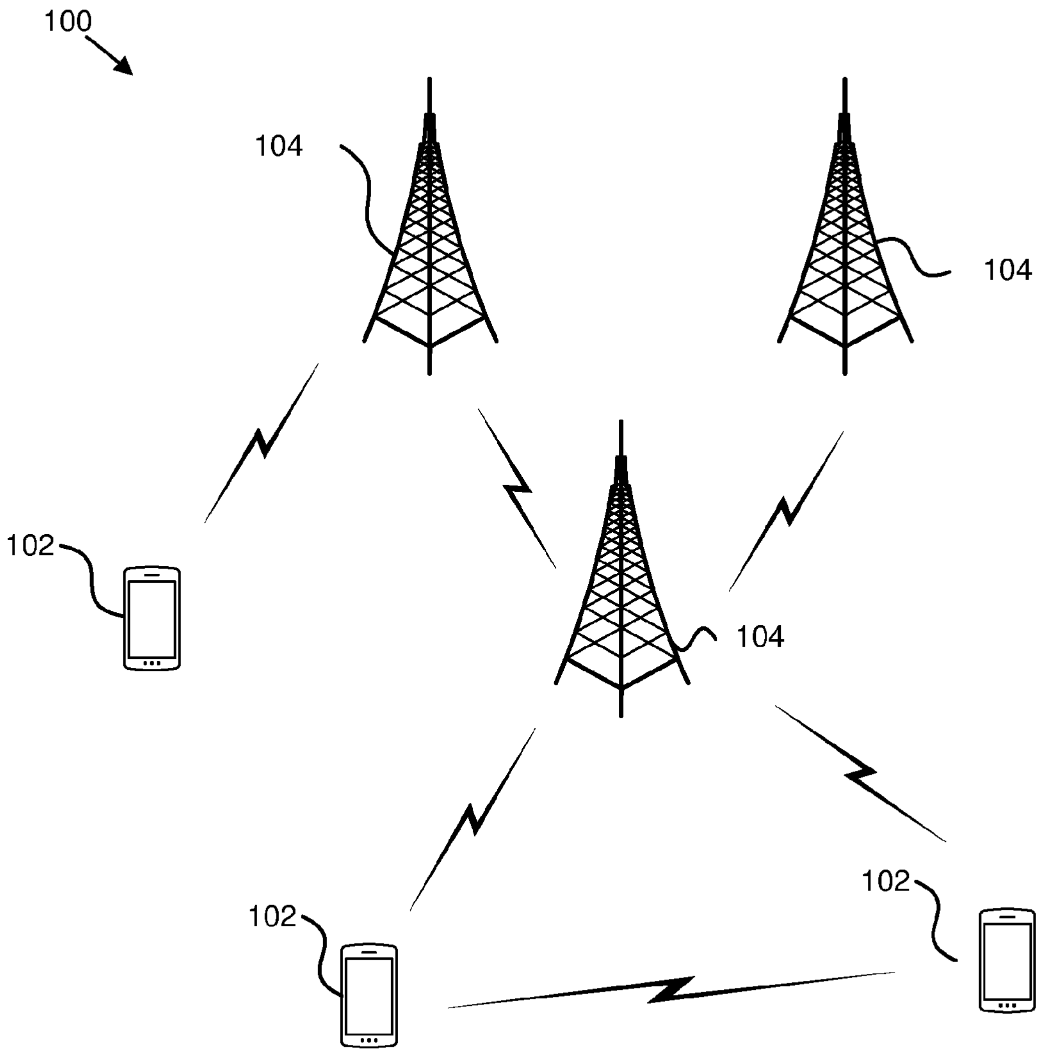
FIG. 1 is a schematic block diagram illustrating one embodiment of a wireless communication system for communicating based on quasi-collocation properties.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment." "in an embodiment," and similar language throughout this specification may, but do not necessarily, all refer to the same embodiment, but mean "one or more but not all embodiments" unless expressly specified otherwise. The terms "including." "comprising." "having." and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for communicating based on quasi-collocation properties. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an integrated access and backhaul (IAB) donor, an IAB node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth R', ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive, at a first wireless communication node, a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. In some embodiments, the network unit 104 may determine whether the second functional entity performs the second communication based in part on the control message. Accordingly, the network unit 104 may be used for communicating based on quasi-collocation properties.

In certain embodiments, a network unit 104 may receive, at an integrated access and backhaul (IAB) node, a medium access control (MAC) control element (CE) message from a parent node. The MAC CE message includes a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception. In various embodiments, the network unit 104 may determine whether the IAB-DU performs the second transmission or the second reception based in part on: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof: or some combination thereof. Accordingly, the network unit 104 may be used for communicating based on quasi-collocation properties.

Figure 2:
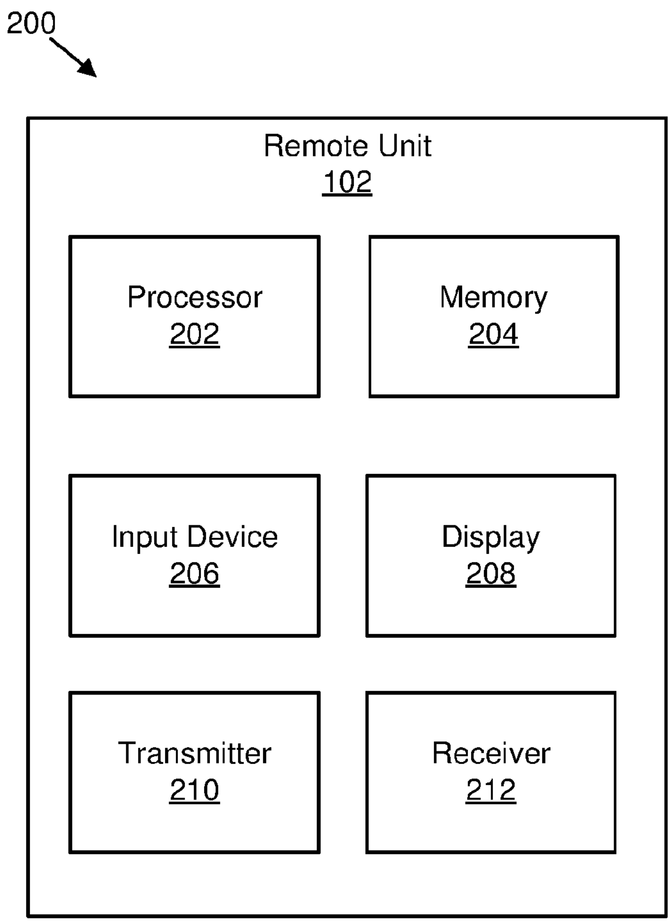
FIG. 2 is a schematic block diagram illustrating one embodiment of an apparatus that may be used for communicating based on quasi-collocation properties.

FIG. 2 depicts one embodiment of an apparatus 200 that may be used for communicating based on quasi-collocation properties. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
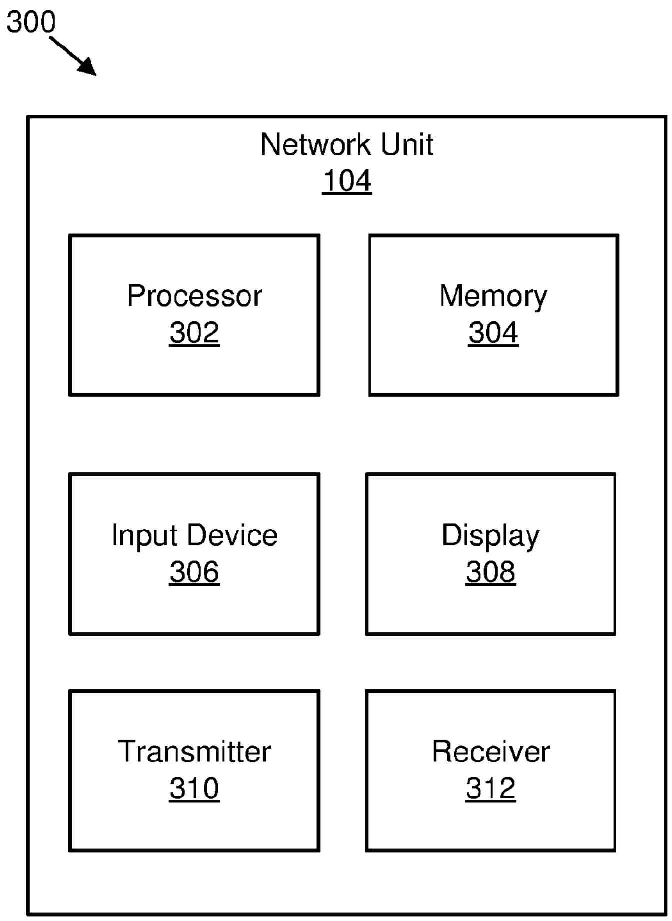
FIG. 3 is a schematic block diagram illustrating one embodiment of an apparatus that may be used for communicating based on quasi-collocation properties.

FIG. 3 depicts one embodiment of an apparatus 300 that may be used for communicating based on quasi-collocation properties. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. In various embodiments, the processor 302 determines whether the second functional entity performs the second communication based in part on the control message.

In some embodiments, the receiver 312 receives a medium access control (MAC) control element (CE) message from a parent node. The MAC CE message includes a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception. In various embodiments, the processor 302 determines whether the IAB-DU performs the second transmission or the second reception based in part on the processor: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof; or some combination thereof.

It should be noted that one or more embodiments described herein may be combined into a single embodiment. In certain embodiments, integrated access and backhaul ("IAB") may be used for new radio ("NR") access technology. The IAB technology aims at increasing deployment flexibility and reducing fifth generation ("5G") rollout costs. Moreover, IAB allows service providers to reduce cell planning and spectrum planning efforts while using the wireless backhaul technology.

In some embodiments, although IAB is not limited to a specific multiplexing and duplexing scheme, it may focus is on time-division multiplexing ("TDM") between upstream communications (e.g., with a parent IAB node or IAB donor) and downstream communications (e.g., with a child IAB node or a UE).

In various embodiments, IAB system enhance resource multiplexing for supporting simultaneous operations (e.g., transmissions and/or receptions) in downstream and upstream by an IAB node includes duplexing enhancements, such as: 1) specification of enhancements to the resource multiplexing between child and parent links of an IAB node, including, a) support of simultaneous operation (e.g., transmission and/or reception) of IAB-node's child and parent links (e.g., mobile terminal ("MT") MT transmit ("TX") and distributed unit ("DU") TX, MT TX and DU receive ("RX"), MT RX and DU TX, MT RX and DU RX), and b) support for dual-connectivity scenarios defined in the context of topology redundancy for improved robustness and load balancing: and/or 2) specification of IAB-node timing modes, extensions for downlink ("DL") and/or UL power control, and command line interface ("CLI") and interference measurements of backhaul ("BH") links, as needed, to support simultaneous operation (e.g., transmission and/or reception) by IAB-node's child and parent links.

In certain embodiments, interference management may be enhanced to facilitate multiplexing between communications with parent and child IAB nodes. The interference includes self-interference ("SI") (e.g., interference from one antenna panel to another antenna panel), cross-link interference ("CLI") (e.g., interference from one a parent-child pair to another parent-child pair), and inter-cell interference ("ICI").

In some embodiments, inter-cell interference may be excessive for small cells connected to an IAB donor, especially at higher frequencies with a higher signal directivity, as beamforming by the IAB donor for serving a small cell IAB node may interfere with a child node of the IAB node or a UE in the small cell. A similar interference scenario is possible in the opposite direction (e.g., a child node or a user equipment ("UE") transmitting a signal to a small cell IAB node may interfere with a signal from the small cell IAB node being transmitted to the IAB donor). This interference may be handled by proper beam management (e.g., avoiding beams that cause excessive interference between parent and child nodes of an IAB node when performing enhanced multiplexing, even if those beams are 'optimal' in a time-division multiplexing scenario).

In various embodiments, there may be systems and methods for enhanced beam training and channel state information ("CSI") acquisition, such as via physical layer and link layer (e.g., layer 1 ("L1") and/or layer 2 ("L2")) signaling).

Figure 4:
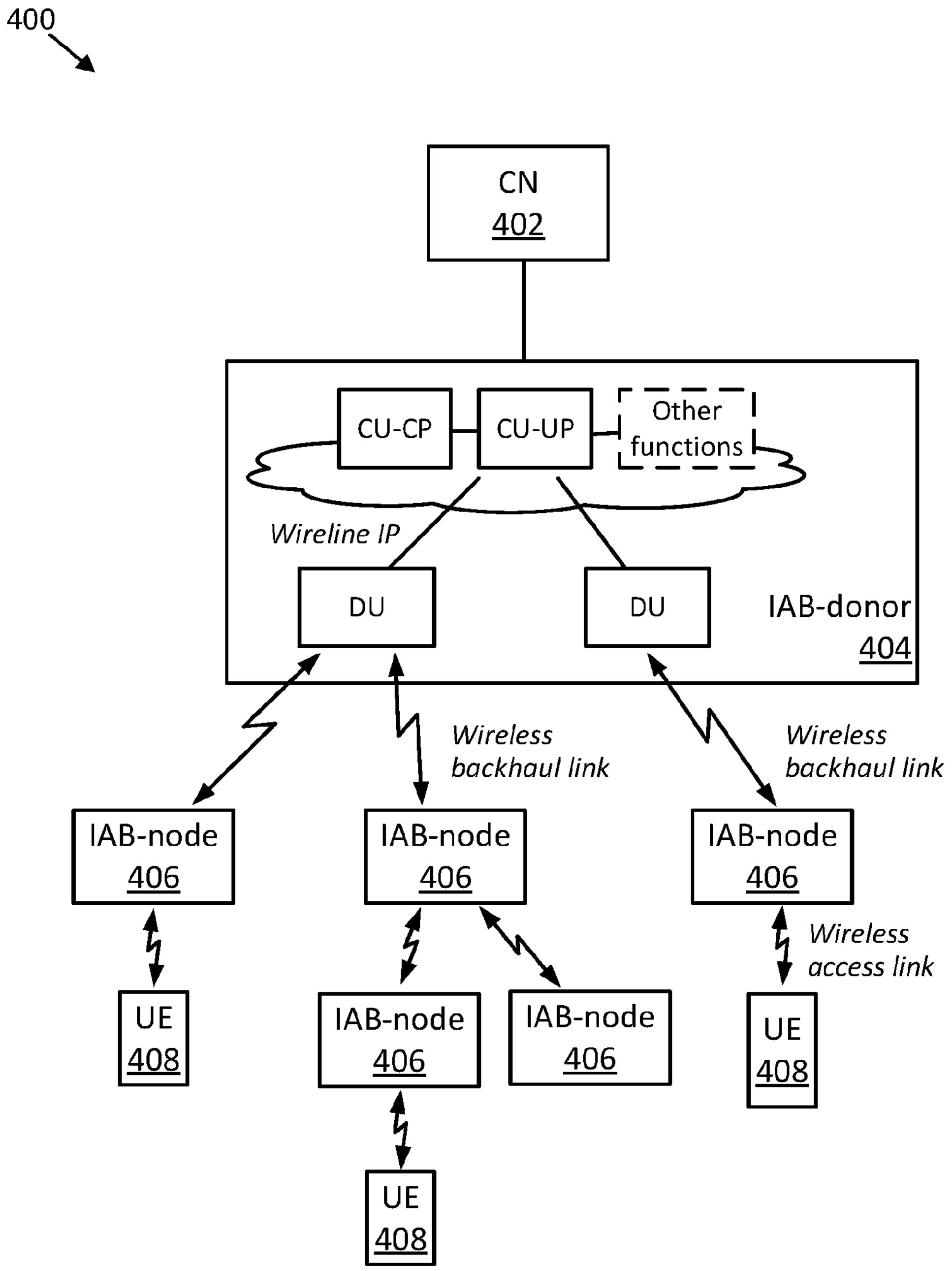
FIG. 4 is a schematic block diagram illustrating one embodiment of an IAB system in standalone mode.

FIG. 4 is a schematic block diagram illustrating one embodiment of an IAB system 400 in standalone mode. The IAB system 400 includes a core network ("CN") 402, an IAB-donor 404, IAB-nodes 406, and UEs 408. The CN 402 is connected to the IAB donor 404 of the IAB system 400 through a backhaul link, which is typically wired. The IAB donor 404 includes a central unit ("CU") that communicates with all the distributed units ("DUs") in the system through an F1 interface. The IAB donor 404 is a single logical node that may include a set of functions such as gNB-DU, gNB-CU-CP, gNB-CU-UP, and so forth. In certain deployments, the IAB donor 404 may be split according to these functions, which may all be either collocated or non-collocated. Moreover, each IAB node may be functionally split into at least a DU and a mobile terminal ("MT"). An MT of an IAB node may be connected to a DU of a parent node, which may be another IAB node or an IAB donor. A Uu link between an MT of an IAB node (called an IAB-MT) and a DU of a parent node (called an IAB-DU) is called a wireless backhaul link. In a wireless backhaul link, in terms of functionalities, the MT is similar to a UE and the DU of the parent node is similar to a base station in a conventional cellular wireless access link. Therefore, a link from an MT to a serving cell that is a DU of a parent link is called an uplink, and a link in the reverse direction is called a downlink. As used herein, embodiments may refer to an uplink or a downlink between IAB nodes, an upstream link or a downstream link of an IAB node, a link between a node and its parent node, a link between a node and its child node, and so forth without a direct reference to an IAB-MT, IAB-DU, serving cell, and so forth.

Each IAB donor or IAB node may serve UEs through access links. IAB systems may be designed to enable multi-hop communications (e.g., a UE may be connected to a core network through an access link and multiple backhaul links between IAB nodes and an IAB donor). As used herein, unless stated otherwise, an IAB node may refer to an IAB node or an IAB donor.

Figure 5:
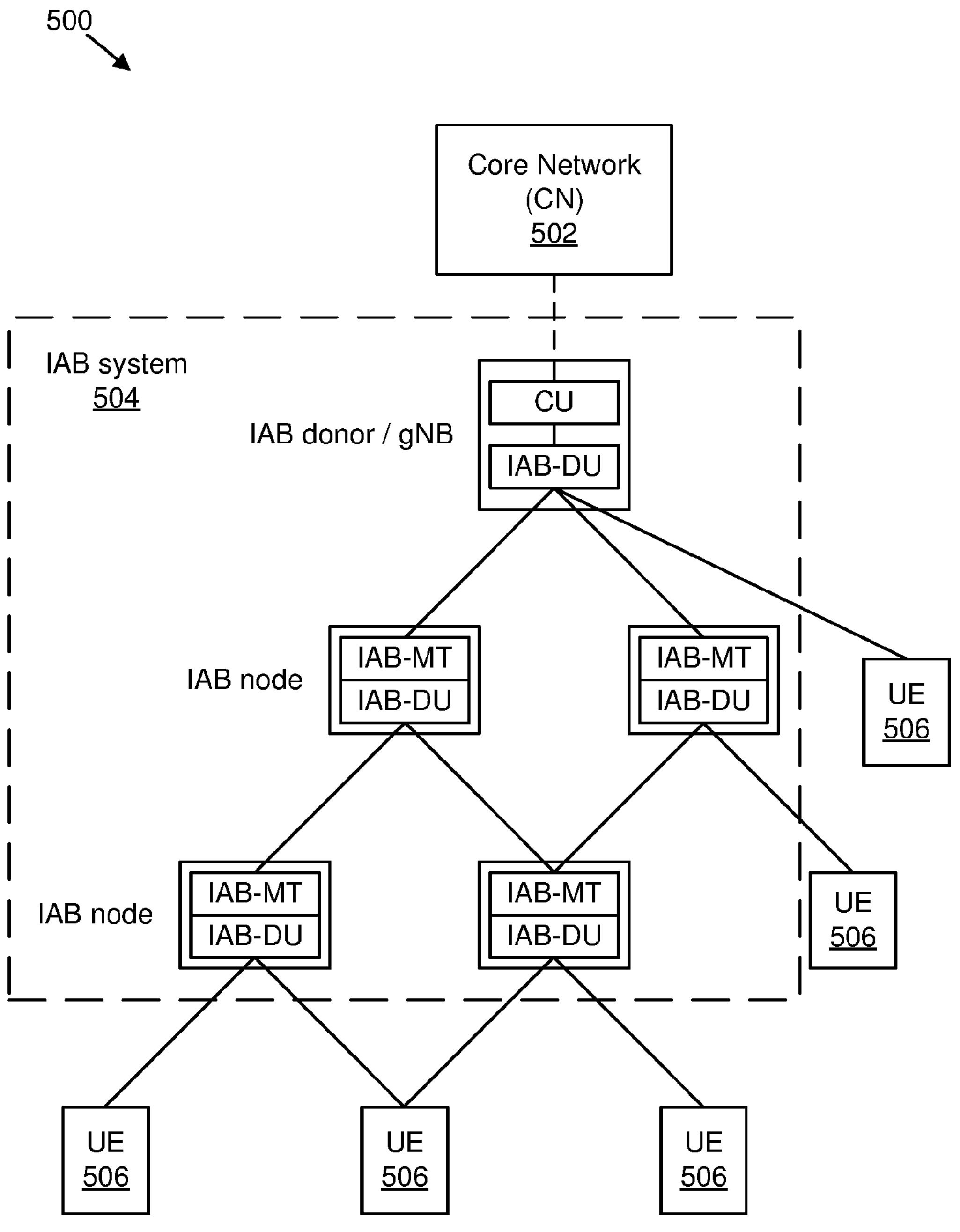
FIG. 5 is a schematic block diagram illustrating another embodiment of a system.

FIG. 5 is a schematic block diagram illustrating another embodiment of a system 500. Specifically, FIG. 5 illustrates functional splits of an IAB donor and IAB nodes. In this figure, an IAB node or a UE can be served by more than one serving cell as they support dual connectivity ("DC"). The system 500 includes a CN 502, an IAB system 504, and UEs 506. The CU and/or DU ("CU/DU") split is in an IAB donor in the IAB system 504, and the DU/MT split is in IAB nodes in the IAB system 504.

It should be noted that a node and/or link closer to the IAB donor and/or CN 502 is called an upstream node and/or link. For example, a parent node of a subject node is an upstream node of the subject node and the link to the parent node is an upstream link with respect to the subject node. Similarly, a node and/or link farther from the IAB donor and/or core network is called a downstream node and/or link. For example, a child node of a subject node is a downstream node of the subject node and the link to the child node is a downstream link with respect to the subject node.

Table 1 summarize the terminology used herein for the sake of brevity versus a description that may appear in a specification.

TABLE 1

| Phrase | Description |
|---|---|
| Wireless backhaul link | A connection between an MT of an IAB node and a DU of a serving cell |
| Wireless access link | A connection between a UE and (a DU of) a serving cell |
| IAB-node/IAB node | RAN node that supports NR access links to UEs and NR backhaul links to parent nodes and child nodes |
| IAB-MT | IAB-node function that terminates the Uu interface to the parent node |
| IAB-DU | gNB-DU functionality supported by the IAB-node to terminate the NR access interface to UEs and next-hop IAB-nodes, and to terminate the F1 protocol to the gNB-CU functionality on the IAB-donor |
| IAB-donor/IAB donor | gNB that provides network access to UEs via a network of backhaul and access links |
| Parent [IAB] node | An IAB node or IAB donor that comprises a serving cell of the subject node. In some examples, IAB-MT's next hop neighbour node; the parent node may be an IAB-DU of an IAB-node or an IAB-donor. |
| Child [IAB] node | An IAB node that identifies the subject node as a serving cell. In some examples, IAB-DU's next hop neighbour node; the child node is also an IAB-node. In some embodiments, a UE or an enhanced UE or an IAB-enhanced UE may perform similarly to a child IAB node. |
| Sibling [IAB] node | An IAB node that has a common parent with the subject node |
| Uplink (of a wireless backhaul link) | A link from an MT to a DU of a parent node |
| Downlink (of a wireless backhaul link) | A link from a DU to an MT of a child node |
| Upstream node/link/etc. | A node/link/etc. (topologically) closer to the IAB donor/core network. Direction toward a parent node in an IAB topology. |
| Downstream node/link/etc. | A node/link/etc. (topologically) farther from the IAB donor/core network. Direction toward a child node or UE in an IAB topology. |

In certain embodiments, an "operation" or a "communication" may refer to a transmission or a reception in an uplink (or upstream) or a downlink (or downstream). Furthermore, the terms "simultaneous operation" or "simultaneous communications" may refer to multiplexing and/or duplexing transmissions and/or receptions by a node through one or more antennas and/or panels. Simultaneous operation, if not described explicitly, may be understood from the context.

In certain embodiments, procedures for beam management for a UE in a radio resource control ("RRC") connected ("RRC_CONNECTED") mode include: 1) beam acquisition and maintenance: 2) beam indication: and/or 3) beam failure recovery.

In some embodiments, following a beam-based initial access that allows a UE to establish an RRC connection with a gNB, the gNB can configure beam acquisition and maintenance procedures through RRC signaling for the UE.

In various embodiments, a UE can be configured with M resource settings, each configured through a CSI-ResourceConfig information element ("IE"), and N reporting settings, each configured through a CSI-ReportConfig IE. The UE is expected to perform measurements on the reference signals (e.g., CSI-RS or SS/PBCH blocks) transmitted by the gNB on the configured resources indicated by field of type CSI-ResourceConfigId in a reporting setting to produce the associated report. The timing of producing and transmitting a report is controlled by the network through physical layer, medium access control ("MAC") layer, and/or RRC signaling—a periodic report is produced and transmitted as configured by the RRC: a semi-persistent report is activated and/or deactivated by MAC signaling: and an aperiodic report requires a triggering by a DCI message. Next, if the gNB intends to indicate a beam for communications, it uses a transmission configuration indication ("TCI") parameter, which indicates a quasi-collocation ("QCL") between a reference signal resource (e.g., a CSI-RS resource or an SS/PBCH block resource) and a demodulation ("DM") reference signal ("RS") ("DM-RS") of the upcoming communication. A QCL indication of "Type D" indicates that the UE is expected to use the same beams it has used for receiving and/or transmitting the reference signal to receive and/or transmit the upcoming communication.

Figure 6:
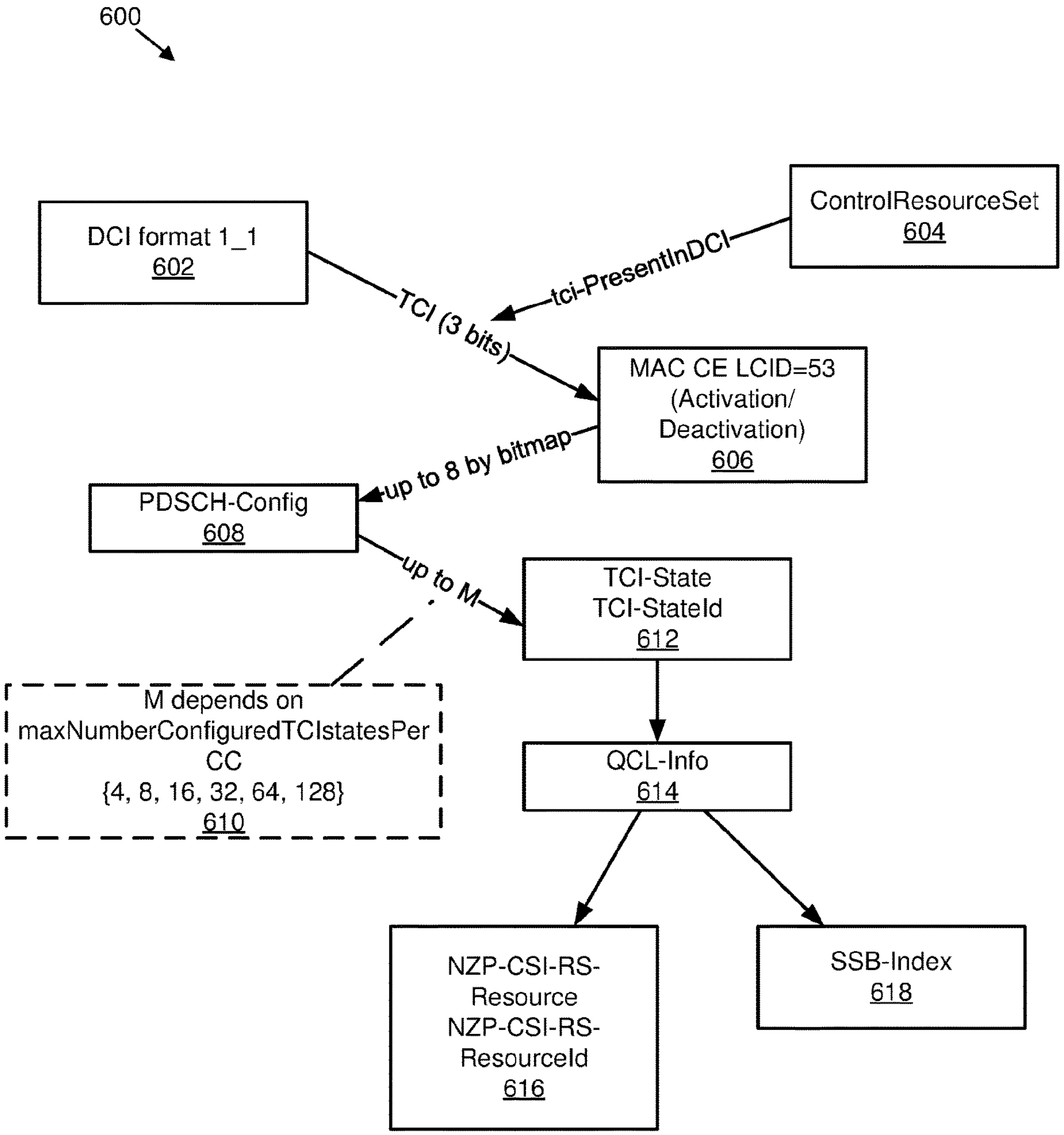
FIG. 6 is a schematic block diagram illustrating one embodiment of a method for QCL indication in NR.

FIG. 6 illustrates how DCI format 1_1 indicates QCL to a CSI-RS resource identifier ("ID") or a synchronization signal block ("SSB") index.

FIG. 6 is a schematic block diagram illustrating one embodiment of a method 600 for QCL indication in NR. A DCI format 1_1 602 transmits TCI (e.g., 3 bits) and a ControlResourceSet 604 transmits tci-PresentInDCI for MAC control element ("CE") logical channel identifier ("LCID")=53 606 (e.g., activation and/or deactivation) which transfers up to 8 by bitmap. A PDSCH-Config 608 transmits up to M, where M depends on maxNumberConfiguredTCIstatesPer component carrier ("CC") {4, 8, 16, 32, 64, 128} 610, to TCI-State TCI-StateId 612 which transmits to QCL-Infor 614 which outputs to NZP-CSI-RS-Resource NZP-CSI-RS-ResourceId 616 and SSB-Index 618.

In certain embodiments, beam failure recovery is specified to allow a user equipment ("UE") to recover from beam failure and continue communications on newly established beam pairs. In some embodiments, a framework is reused for beam management between fixed and/or parent IAB nodes and/or donors and mobile and/or child IAB nodes.

In some embodiments, resources may be configured as hard ("H"), soft ("S"), or not available ("NA"). Hard resources may be assumed available for scheduling by an IAB node and NA resources may not be assumed available, while soft resources may be indicated available or not available dynamically. A dynamic availability indication ("AI") for soft resources may be performed by DCI format 2_5 from a parent IAB node and/or donor, and may have similarities in formats and definitions with SFI (e.g., DCI format 2_0).

In various embodiments, resources may be shared between backhaul and access links, which may be configured semi-statically by a CU (e.g., IAB donor at layer-3) or dynamically by DU (e.g., parent IAB node at layer-1). Multiplexing between backhaul link and access link resources may be TDM, frequency division multiplexing ("FDM"), or may allow time-frequency resource sharing. Furthermore, resources may be allocated exactly (e.g., per node or per link) or in the form of a resource pool.

In certain embodiments, semi-static configuration at layer-2 or layer-3 may be allowed for sharing resources between backhaul and access. It should be noted that an emphasis may be on configuration of resources for backhaul verses access rather than upstream verses downstream. However, under dynamic scheduling, an IAB node can use resources not used by the parent IAB node for backhaul to schedule the access link.

In some embodiments, semi-static verses dynamic resource coordination may be used. In various embodiments, flexible ("F") may be used in DCI 2_0 and a state access ("A") for determining slot format and sharing resources may use an access link.

In certain embodiments, an IAB system may be connected to a core network through one or more IAB donors. Further, each IAB node may be connected to an IAB donor and/or other IAB nodes through wireless backhaul links. Each IAB donor and/or node may also serve UEs.

Figure 7:
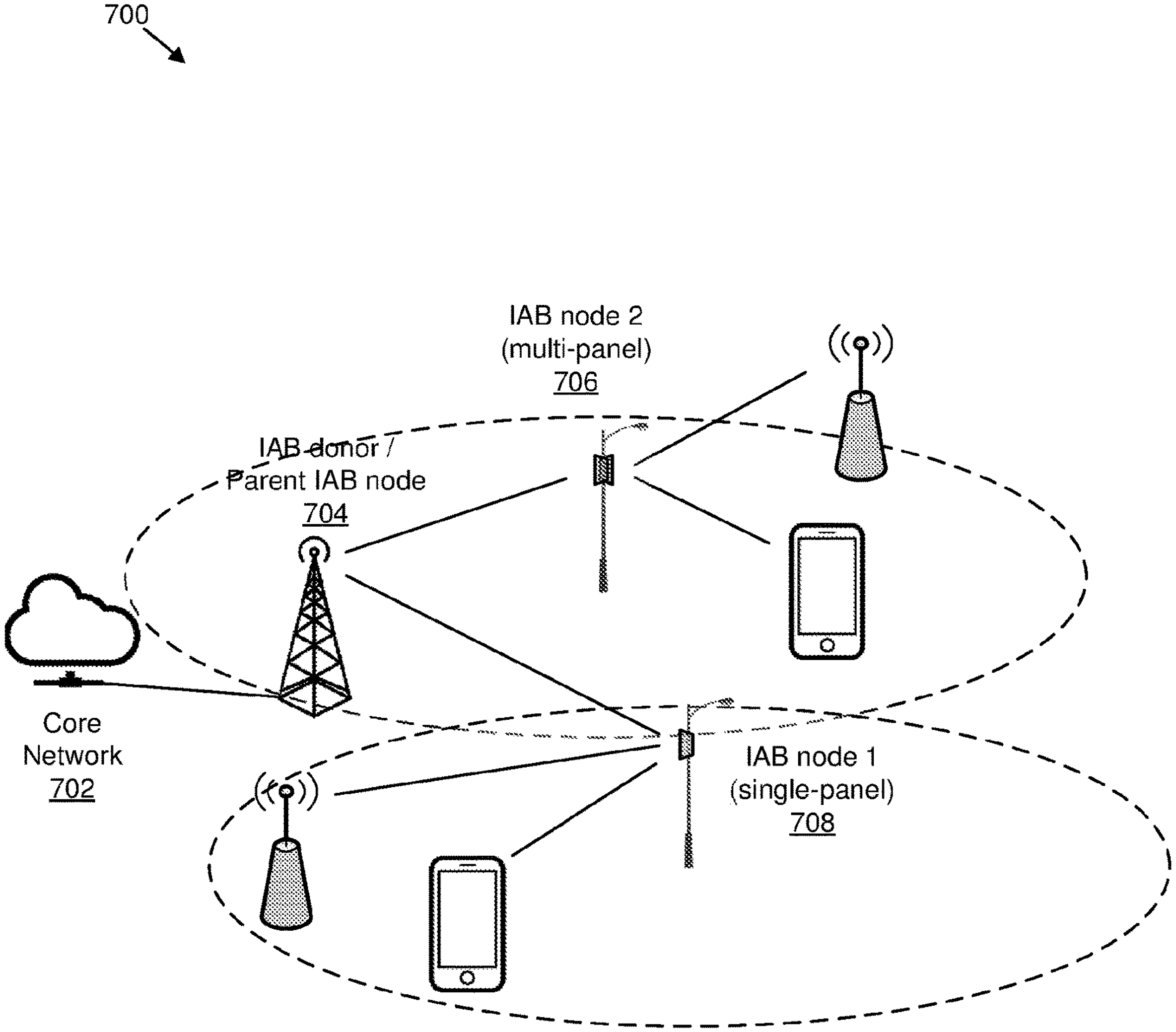
FIG. 7 is a schematic block diagram illustrating one embodiment of an IAB system with single-panel and multi-panel IAB nodes.

FIG. 7 is a schematic block diagram illustrating one embodiment of an IAB system 700 with single-panel and multi-panel IAB nodes. The IAB system 700 includes a core network 702, an IAB donor and/or parent IAB node 704, an IAB node 2 (e.g., multi-panel) 706, and an IAB node 1 (e.g., single-panel) 708.

There are various options with regards to the structure and multiplexing and/or duplexing capabilities of an IAB node. For example, each IAB node may have one or may antenna panels, each connected to the baseband unit through a radio frequency ("RF") chain. The one or may antenna panels may be able to serve a wide spatial area of interest in a vicinity of the IAB node, or otherwise each antenna panel or each group of antenna panels may provide a partial coverage such as a "sector." An IAB node with multiple antenna panels, each serving a separate spatial area or sector, may still be referred to as a single-panel IAB node as it behaves similarly to a single-panel IAB node for communications in each of the separate spatial areas or sectors.

In some embodiments, each antenna panel may be half-duplex ("HD"), meaning that it is able to either transmit or receive signals in a frequency band at a time, or full-duplex ("FD"), meaning that it is able to both transmit and receive signals in a frequency band simultaneously. Unlike full-duplex radio, half-duplex radio is widely implemented and used in practice and may be assumed to be a default mode of operation in wireless systems.

Table 2 lists different duplexing scenarios of interest if multiplexing is not constrained to time-division multiplexing ("TDM"). In table 4, single-panel and multi-panel IAB nodes are considered for different cases of simultaneous transmission and/or reception. Spatial-division multiplexing ("SDM") may refer to either transmission or reception on downlink (or downstream) and uplink (or upstream) simultaneously: full duplex ("FD") may refer to simultaneous transmission and reception by a same antenna panel in a frequency band: and multi-panel transmission and reception ("MPTR") may refer to simultaneous transmission and/or reception by multiple antenna panels where each antenna panel either transmits or receives in a frequency band at a time.

TABLE 2

| Case# | Architecture/ Capability | Simultaneous TX/RX Type | IAB-MT | IAB-DU | Scenario# |
|---|---|---|---|---|---|
| Case A/ | Single-panel | TX SDM | UL-TX | DL-TX | S3 |
| Case#1 | Multi-panel | TX MPTR/SDM | UL-TX | DL-TX | S7 |
| Case B/ | Single-panel | RX SDM | DL-RX | UL-RX | S1 |
| Case#2 | Multi-panel | RX MPTR/SDM | DL-RX | UL-RX | S5 |
| Case C/ | Single-panel | UL FD | UL-TX | UL-RX | S4 |
| Case#3 | Multi-panel | UL MPTR/FD | UL-TX | UL-RX | S8 |
| Case D/ | Single-panel | DL FD | DL-RX | DL-TX | S2 |
| Case#4 | Multi-panel | DL MPTR/FD | DL-RX | DL-TX | S6 |

Figure 8:
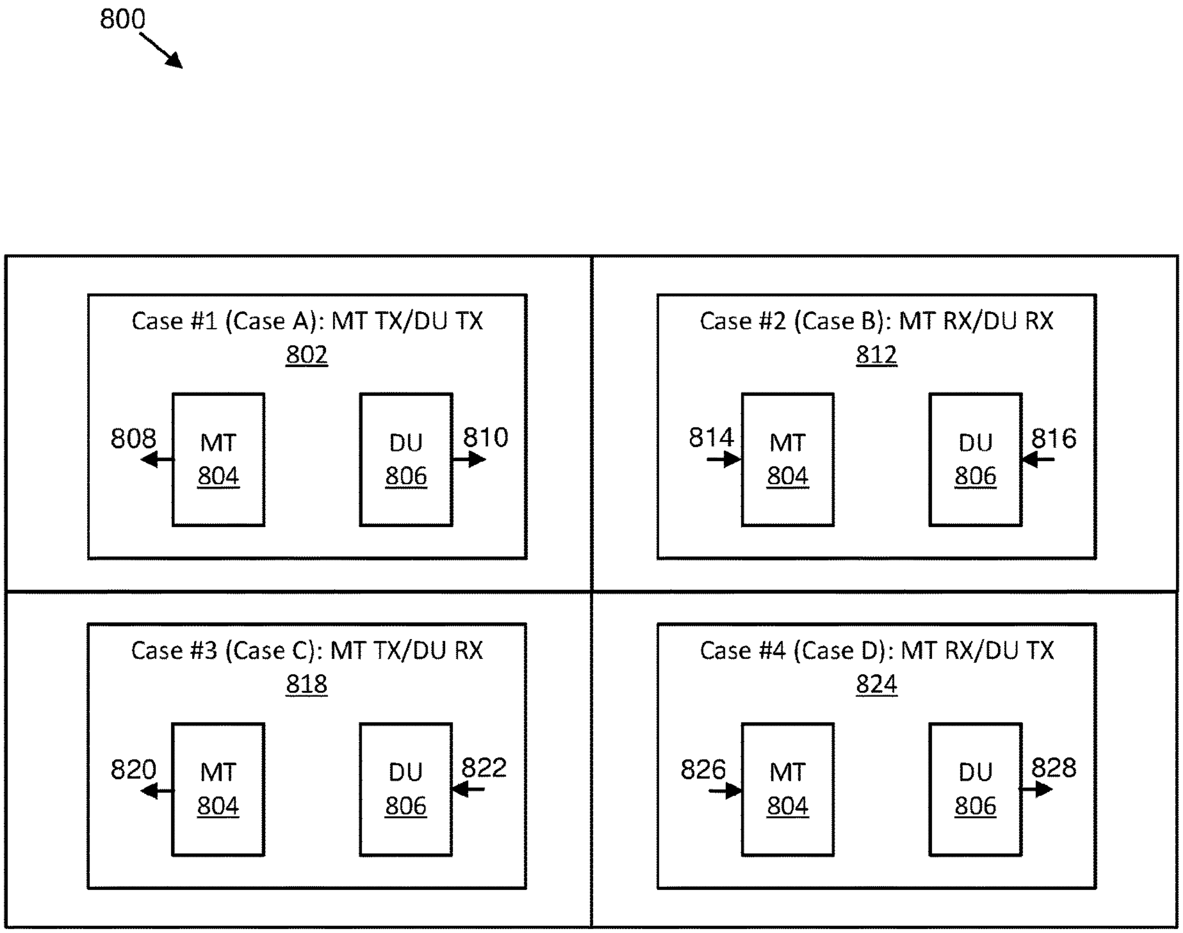
FIG. 8 is a schematic block diagram illustrating one embodiment of types of simultaneous transmission and/or reception operations.

In Table 2, based on a type of simultaneous operations and a number of panels in an IAB node, the scenarios are called S1, S2, . . . , S8, while the "Case" numbers (e.g., A/B/C/D or 1/2/3/4) may be in accordance with FIG. 8.

FIG. 8 is a schematic block diagram 800 illustrating one embodiment of types of simultaneous transmission and/or reception operations. The diagram 800 illustrates a first case 802 (e.g., Case #1, Case A, MT TX and DU TX) having an MT 804 and a DU 806, in which the MT 804 transmits 808 and the DU 806 transmits 810. Moreover, the diagram 800 illustrates a second case 812 (e.g., Case #2, Case B, MT RX and DU RX) having the MT 804 and the DU 806, in which the MT 804 receives 814 and the DU 806 receives 816. Further, the diagram 800 illustrates a third case 818 (e.g., Case #3, Case C, MT TX and DU RX) having the MT 804 and the DU 806, in which the MT 804 transmits 820 and the DU 806 receives 822. The diagram 800 illustrates a fourth case 824 (e.g., Case #4, Case D, MT RX and DU TX) having the MT 804 and the DU 806, in which the MT 804 receives 826 and the DU 806 transmits 828. As used herein, different cases may be referred to by the case #, case letter, or description as found in FIG. 8.

Figure 9:
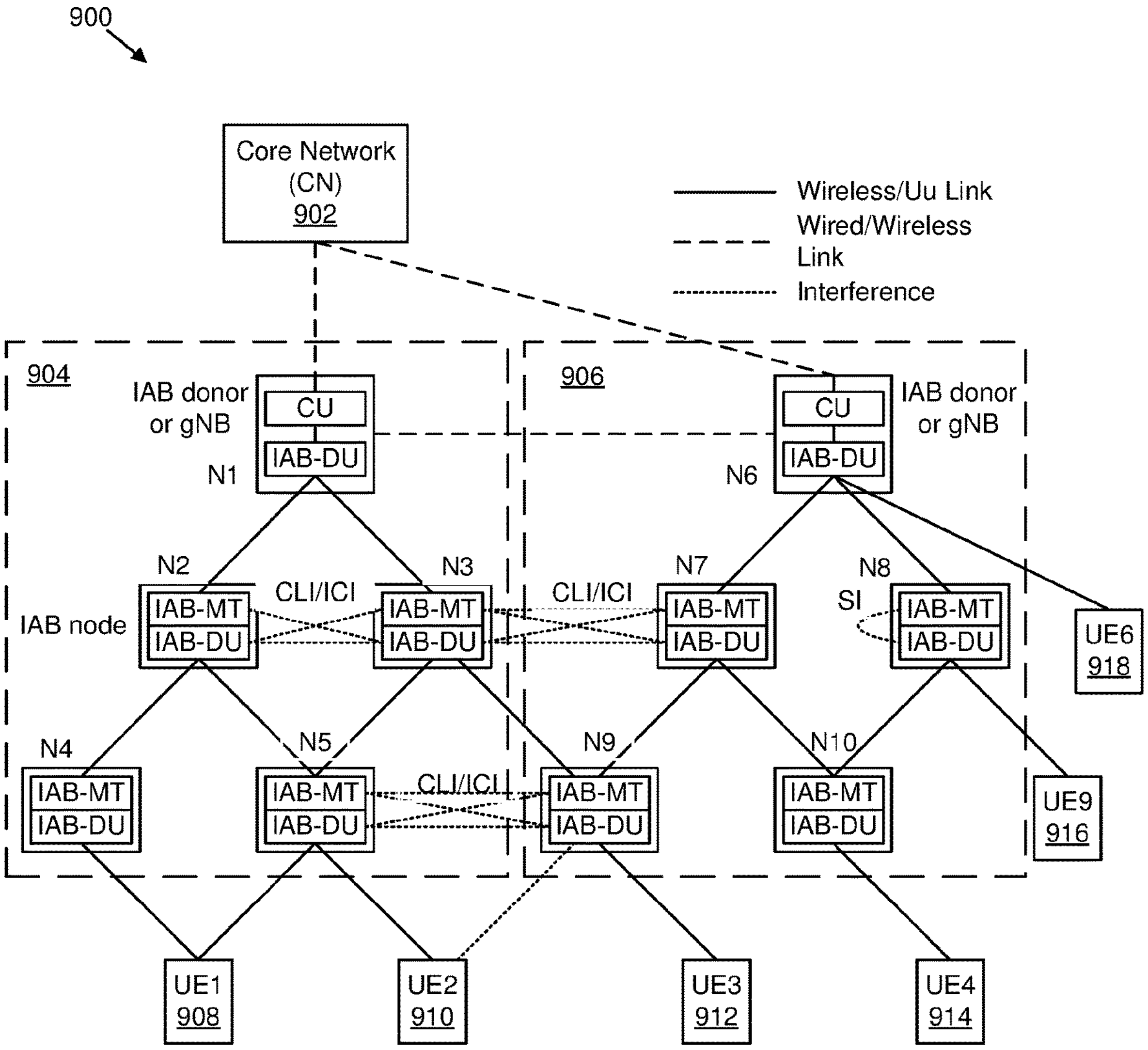
FIG. 9 is a schematic block diagram illustrating one embodiment of a system having CLI/ICI and/or SI.

FIG. 9 is a schematic block diagram illustrating one embodiment of a system 900 having CLI, inter-cell interference ("ICI"), and/or SI. The system 900 includes a core network 902 ("CN"), a first IAB system 904, a second IAB system 906, a first UE 908 (UE1), a second UE 910 (UE2), a third UE 912 (UE3), a fourth UE 914 (UE4), a fifth UE 916 (UE5), and a sixth UE 918 (UE6). Each of the first IAB system 904 and the second IAB system 906 includes a central unit ("CU"), multiple IAB DUs ("IAB-DU"), and multiple IAB MTs ("IAB-MT") that are part of a number of IAB nodes labeled N1 through N10. As shown in FIG. 9, CLI and/or ICI may occur between different IAB nodes. Moreover, SI may occur with a same IAB node.

In FIG. 9, the two IAB systems 904 and 906 are connected to the CN 902, each via an IAB donor (or gNB). Examples of CLI and SI are illustrated in FIG. 9 as follows: 1) communications by an IAB node and/or donor may cause a CLI on a nearby IAB node and/or donor—for example, a transmission by an IAB-DU and/or IAB-MT of N2 may cause a CLI on an IAB-DU or an IAB-MT of N3, or vice versa: 2) CLI may occur between IAB nodes and/or donors in multiple IAB systems—for example, a transmission by an IAB-DU or an IAB-MT of N3 may cause a CLI on an IAB-DU or an IAB-MT of N7, or vice versa: 3) CLI may also occur between an IAB node and/or donor in an IAB system and a UE served by the same or a different IAB system—for example, a transmission by UE2 may cause an interference on N9, or vice versa: and 4) SI may occur among antennas and/or panels of an IAB node and/or donor—for example, a transmission by an IAB-DU of N8 may cause an interference on an IAB-MT of N8, or vice versa—SI may also occur among antennas and/or panels performing operations for a same IAB-DU or different IAB-DUs or a same IAB-MT or different IAB-MTs.

In certain embodiments, depending on the scenario of simultaneous operations, any CLI and/or SI cases may affect a signal quality. In some embodiments, self-interference may occur for Case C and/or Case D.

It should be noted that, in addition to CLI and SI, ICI may occur and impose limitations on performance. The ICI may occur between IAB cells or between an IAB cell and a conventional cell.

In certain embodiments, multi-hop IAB may be used.

Figure 10:
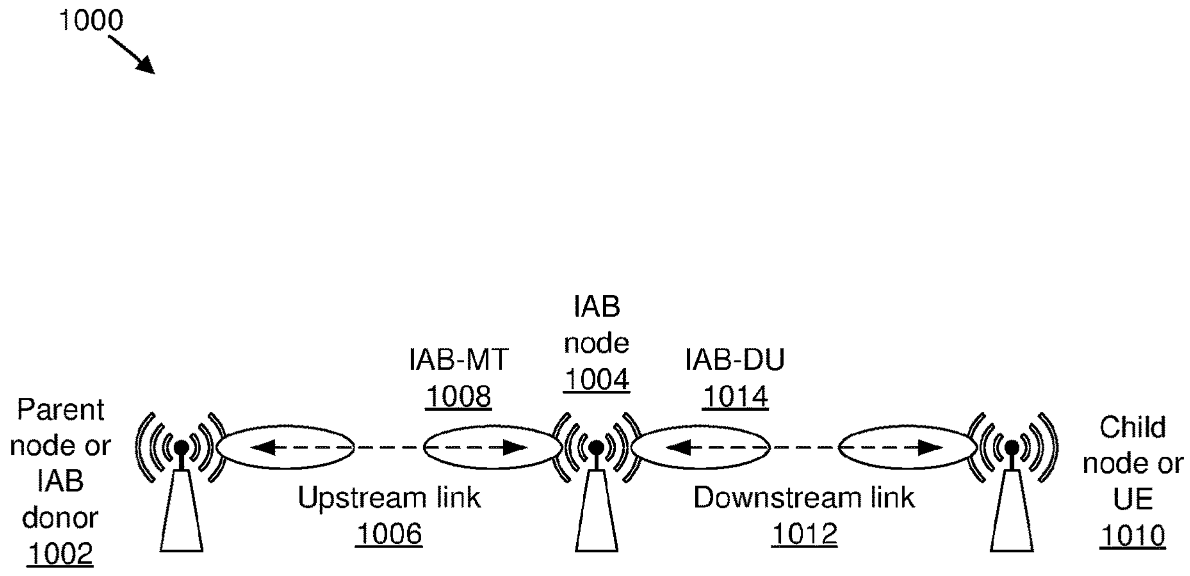
FIG. 10 is a schematic block diagram illustrating one embodiment of a system with an IAB node connected to a parent node and a child node.

FIG. 10 is a schematic block diagram illustrating one embodiment of a system 1000 with an IAB node connected to a parent node 1002 and a child node 1010. The parent node 1002 or IAB donor communicates with an IAB node 1004 via an upstream link 1006 (e.g., via an IAB-MT 1008 of the IAB node 1004), and the IAB node 1004 communicates with the child node 1010 or UE via a downstream link 1012 (e.g., via an IAB-DU 1014).

Figure 11:
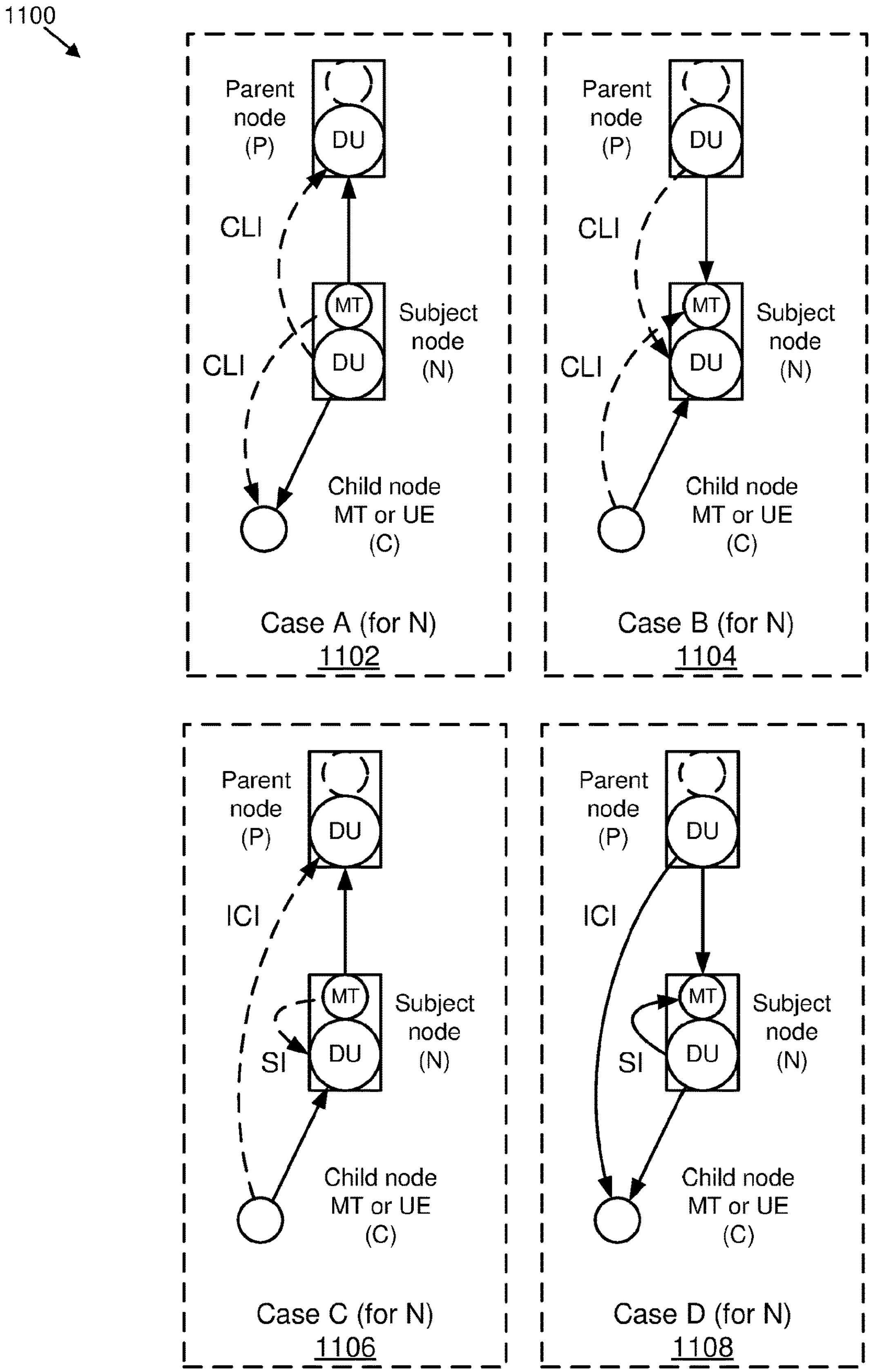
FIG. 11 is a schematic block diagram illustrating one embodiment of a system with interface scenarios for simultaneous IAB-DU and IAB-MT operations.

FIG. 11 is a schematic block diagram illustrating one embodiment of a system 1100 with interface scenarios for simultaneous IAB-DU and IAB-MT operations. The interface scenarios include a Case A 1102 (e.g., for N), a Case B 1104 (e.g., for N), a Case C 1106 (e.g., for N), and a Case D 1108 (e.g., for N).

In some embodiments, there may be methods for channel state information ("CSI") enhancements with the purpose of improving cross-link interference ("CLI") management through proper beam management.

In various embodiments, each of a parent node ("PN"), a subject node ("N"), and a child node ("CN") may be an IAB node. In certain embodiments, a PN may be an IAB donor or a gNB, and/or a CN may be a UE or an enhanced UE. An IAB-MT of N is referred to as N-MT and an IAB-DU of N is referred to as N-DU. In some embodiments, PN or PN-DU may refer to an IAB-DU of a parent node. Similarly, CN or CN-MT may refer to an IAB-MT of a child node. When referring to an operation (e.g., a transmission or a reception), descriptions may refer to an IAB node rather than an IAB-MT or an IAB-DU of the IAB node. In these cases, determining which entity of the IAB node is performing the operation may be understood from the context as follows. When referring to a transmission by N, the transmission may be performed by an IAB-MT of N ("N-MT") if the transmission is in the uplink (e.g., an SRS, a physical uplink control channel ("PUCCH"), a physical uplink shared channel ("PUSCH"), and so forth). A similar principle applies to CU-MT or a UE. When referring to a reception or measurement by N, the reception or measurement may be performed by an IAB-MT of N ("N-MT") if the reception or measurement is in the downlink (e.g., a CSI-RS, an SS/PBCH block, a physical downlink control channel ("PDCCH"), a physical downlink shared channel ("PDSCH"), and so forth). A similar principle applies to CU-MT or a UE. When referring to a transmission by N, the transmission may be performed by an IAB-DU of N ("N-DU") if the transmission is in the downlink (e.g., a CSI-RS, an SS/PBCH block, a PDCCH, a PDSCH, and so forth). A similar principle applies to PN-DU. When referring to a reception or measurement by N, the reception or measurement may be performed by an IAB-DU of N ("N-DU") if the reception or measurement is in the uplink (e.g., an SRS, a PUCCH, a PUSCH, and so forth). A similar principle applies to PN-DU.

In one embodiment, N receives first at least one SRS resource configuration (or a first UL TCI-state configuration or a first UL spatial relation information configuration), first synchronization signal ("SS") and/or physical broadcast channel ("PBCH") block ("SSB") configuration, and/or first at least one CSI-RS resource configuration (or a first DL TCI-state configuration) for N-MT operation in a serving cell provided by PN ("PN-DU"). Furthermore, N receives information of a second SSB configuration, second at least one CSI-RS resource configuration, and/or second at least one SRS resource configuration for N-DU operation.

In one implementation, PN is also informed of the information of the second SSB configuration, second at least one CSI-RS resource configuration, and/or second at least one SRS resource configuration configured for N-DU operation.

If configured and/or dynamically indicated/triggered, N transmits to PN a first type of at least one CSI report including information of at least one pair of an SRS resource index from the first at least one SRS resource configuration (or a UL TCI-state ID corresponding to the first UL TCI-state configuration) and a CSI-RS resource indicator ("CRI") corresponding to the second at least one CSI-RS resource configuration (or an SSB index corresponding to the second SSB configuration). The first type of CSI report indicates a set of preferred beam pairs (e.g., based on QCL or spatial relation information associated with the resources corresponding to the indexes) for simultaneous MT and DU transmissions at N (e.g., corresponding to Case A multiplexing).

If configured and/or dynamically indicated/triggered, N transmits to PN a second type of at least one CSI report including information of at least one pair of a CRI corresponding to the first at least one CSI-RS resource configuration (or a DL TCI-state ID corresponding to the first DL TCI-state configuration, or an SSB index corresponding to the first SSB configuration) and an SRS resource index corresponding to the second at least one SRS resource configuration. The second type of CSI report indicates a set of preferred beam pairs (e.g., based on QCL or spatial relation information associated with the resources corresponding to the indexes) for simultaneous MT and DU receptions at N (e.g., corresponding to Case B multiplexing).

If configured and/or dynamically indicated/triggered, N transmits to PN a third type of at least one CSI report including information of at least one pair of an SRS resource index from the first at least one SRS resource configuration (or a UL TCI-state ID corresponding to the first UL TCI-state configuration) and a SRS resource index corresponding to the second at least one SRS resource configuration. The third type of CSI report indicates a set of preferred beam pairs (e.g., based on QCL or spatial relation information associated with the resources corresponding to the indexes) for simultaneous operation of MT transmission and DU reception at N (e.g., corresponding to Case C multiplexing).

If configured and/or dynamically indicated/triggered, N transmits to PN a fourth type of at least one CSI report including information of at least one pair of a CRI corresponding to the first at least one CSI-RS resource configuration (or a DL TCI-state ID corresponding to the first DL TCI-state configuration, or a SSB index corresponding to the first SSB configuration) and a CRI corresponding to the second at least one CSI-RS resource configuration (or an SSB index corresponding to the second SSB configuration). The fourth type of CSI report indicates a set of preferred beam pairs (e.g., based on QCL or spatial relation information associated with the resources corresponding to the indexes) for simultaneous operation of MT reception and DU transmission at N (e.g., corresponding to Case D multiplexing).

Corresponding to the above first, second, third, and/or fourth types of CSI reports, an IAB-CU may further configure CN or PN with CLI or ICI measurements (and reporting).

In certain embodiments, PN may further receive a UL interference measurement ("U-IM") resource configuration including information of time and frequency resources and information of a pair of an SRS resource index from the first at least one SRS resource configuration (or a UL TCI-state ID corresponding to the first UL TCI-state configuration) and a CRI corresponding to the second at least one CSI-RS resource configuration (or an SSB index corresponding to the second SSB configuration). In one example, the time and frequency resources of U-IM are the same as time and frequency resources of the CRI, and PN determines the time and frequency resources of the U-IM resource based on the CRI. PN may assume that the U-IM resource is QCL'ed with the SRS resource (e.g., SRS resource associated to the SRS resource indicator).

In some embodiments, PN may further receive a DL interference measurement ("D-IM") resource configuration comprising information of time and frequency resources and information of a pair of a CSI-RS resource indicator from the first at least one CSI-RS resource configuration (or an SSB index corresponding to the second SSB configuration) and an SRS resource indicator corresponding to the second at least one SRS resource configuration (or a UL TCI-state ID corresponding to the first UL TCI-state configuration). In one example, the time and frequency resources of D-IM are the same as time and frequency resources of the SRI, and PN determines the time and frequency resources of the D-IM resource based on the SRI. PN may assume that the D-IM resource is QCL'ed with the CSI-RS resource (e.g., CSI-RS resource associated to the CSI resource indicator).

In various embodiments, Case C multiplexing at an IAB node N is realized when an IAB-MT of N transmits an uplink signal to a parent node PN and an IAB-DU of N receives an uplink signal from a child node CN or a UE. Other than a self-interference that may be caused by the IAB-MT transmission on the IAB-DU reception, the uplink transmission by CN may also cause an inter-cell interference ("ICI") on PN. This interference may be more likely than a generic interference between two IAB nodes in a vicinity because PN performs receive beamforming towards N in order to receive the signal from the IAB-MT of N, and if CN happens to be in the vicinity of N (e.g., if N is providing a small cell to serve CN), it is likely that the receive beam by PN captures a strong signal from CN as well.

In certain embodiments, there may be signaling methods to mitigate ICI.

In some embodiments, CN transmits uplink reference signals ("UL-RS") such as sounding reference signals ("SRS") for sounding the uplink channel. SRS is used in certain systems for obtaining CSI of an uplink channel from a UE to a serving gNB, and by extension, that of an uplink channel from a child node CN to serving IAB node N. Here, the SRS configuration information is additionally shared with PN such that PN may perform measurement on the SRS and identify which SRS (e.g., uplink) beams from the CN cause a significant interference on PN while PN may be receiving a signal from N.

Figure 12:
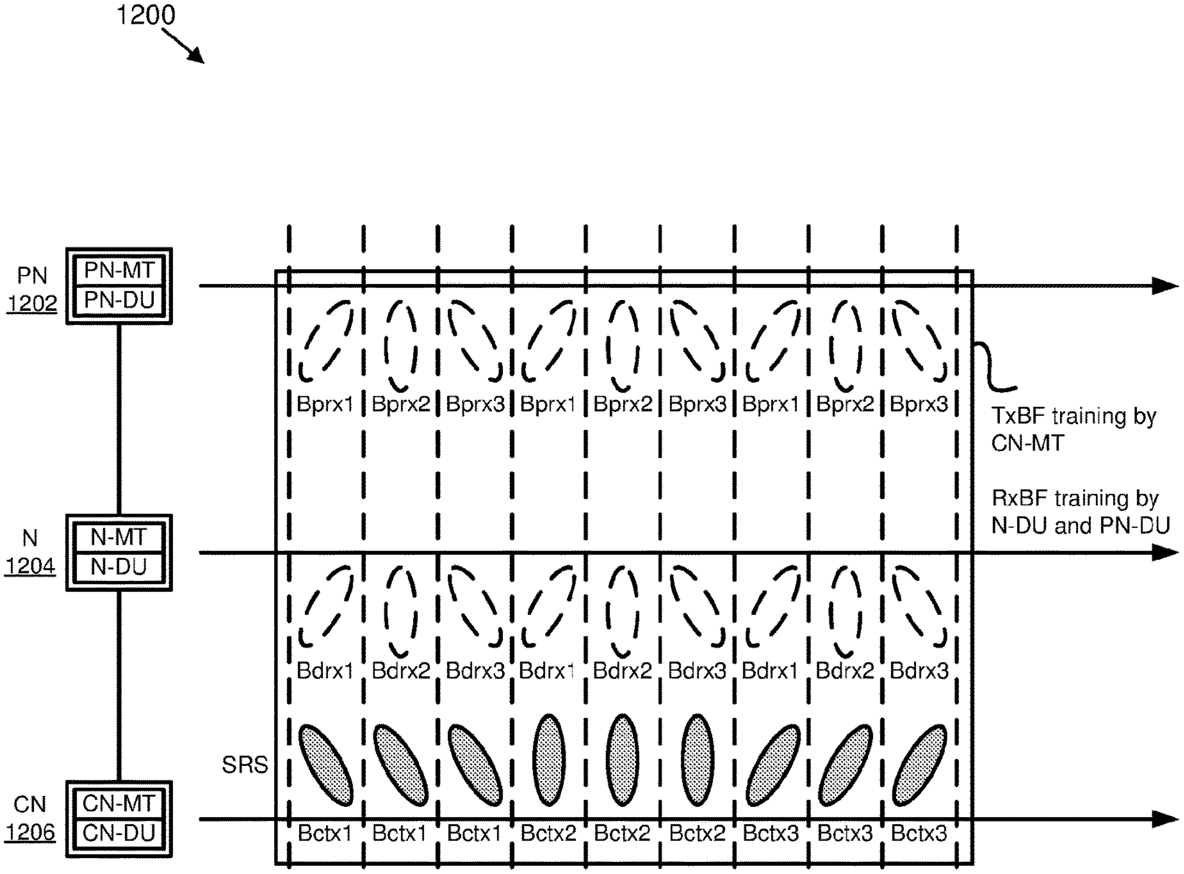
FIG. 12 is a schematic block diagram illustrating one embodiment of a system to transmit beamforming training by a CN (e.g., CN-MT) and receive beamforming training by a N (e.g., N-DU) and a PN (e.g., PN-DU)

An example of this beam training is illustrated in FIG. 12. Specifically, FIG. 12 is a schematic block diagram illustrating one embodiment of a system 1200 to transmit beamforming training by a CN 1206 (e.g., CN-MT) and receive beamforming training by a N 1204 (e.g., N-DU) and a PN 1202 (e.g., PN-DU). In this example, the CN 1206 performs transmit beamforming ("TxBF") training by transmitting beamformed SRS, while the N 1204 and the PN 1202 perform receive beamforming ("RxBF") training by applying different receive beams for measuring the signal on the resources associated with the SRS. In this step, the N 1204 may perform a channel measurement while the PN 1202 may perform an interference measurement on the SRS.

Figure 13:
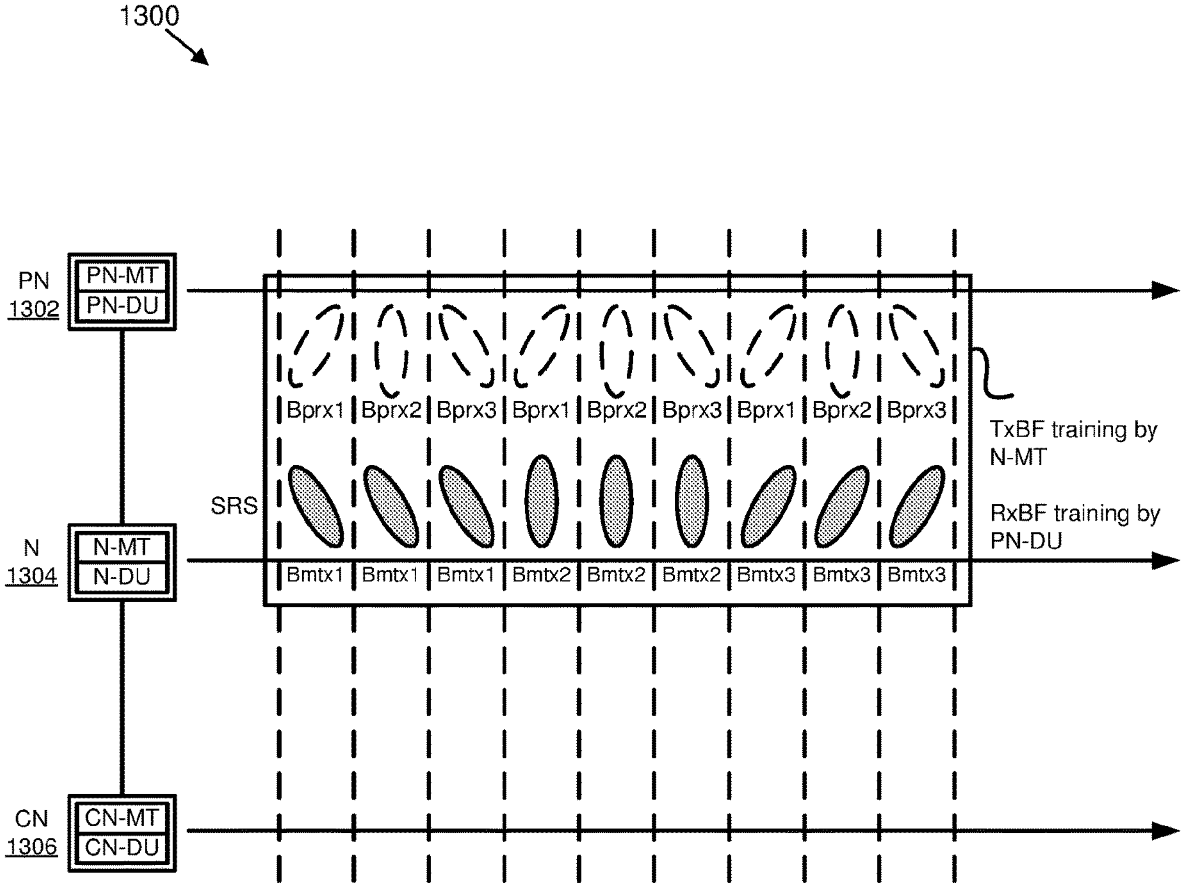
FIG. 13 is a schematic block diagram illustrating one embodiment of a system to transmit beamforming training by a N (e.g., N-MT) and receive beamforming training by a PN (e.g., PN-DU)

In some embodiments, a PN may also perform a beam training procedure with a N, which may include receiving beamformed SRS from the N. An example of this beam training is illustrated in FIG. 13. Specifically, FIG. 13 is a schematic block diagram illustrating one embodiment of a system to transmit beamforming training by a N 1304 (e.g., N-MT) and receive beamforming training by a PN 1306 (e.g., PN-DU). A CN 1306 is also illustrated. In FIG. 13, the PN 1306 may perform a channel measurement on the SRS.

Once the PN 1306 has performed beam training with the CN 1306 and the N 1304, it may indicate to the N 1304 whether a transmit beam by the N 1304 is suitable for transmitting an uplink signal to the PN 1306. Additionally, the PN 1306 may indicate to the N 1304 whether a transmit beam by the CN 1306 is or is not suitable for transmitting an uplink signal to the CN 1306.

In some embodiments, through indications, a PN may enable a Case C multiplexing at N where the signal from N to PN is sufficiently strong and the interference from CN to PN is sufficiently weak. Selecting suitable RX beams for PN, suitable TX beams for N, and suitable or unsuitable TX beams for CN may be based on a PN implementation. However, additional signaling may be used for indicating suitable and/or unsuitable TX beams for CN as a beam indication for a downstream link of an IAB node by its parent node is not supported by the current standard specifications.

For convenience, the indication message including a set of suitable or unsuitable beam indices corresponding to CN may be referred to as a nonadjacent-node beam indication ("NNBI") message. In practice, an NNBI message may be an L1/L2 control message such as a DCI format 2_x message or a MAC CE message with an LCID. In some realizations, an NNBI message may be realized as an availability indication ("AI") in the spatial domain. In various realizations, an NNBI message may be a realized as a beam report that is transmitted by a parent node of an IAB node to the IAB node.

In one embodiment, PN may transmit an NNBI message to N, wherein the NNBI message includes one or more beam indices that CN may use without causing an excessive interference on PN. The beam indices may be indicated to N (e.g., by including SRS resource indicators ("SRIs") corresponding to the beam indices). Then, if N schedules an uplink channel such as a PUSCH for CN, N may indicate a beam index, such as an SRI, from the beam indices indicated in the NNBI message. In this case, each of the beams indicated in the NNBI message may be referred to as suitable, available, and so forth.

Figure 14:
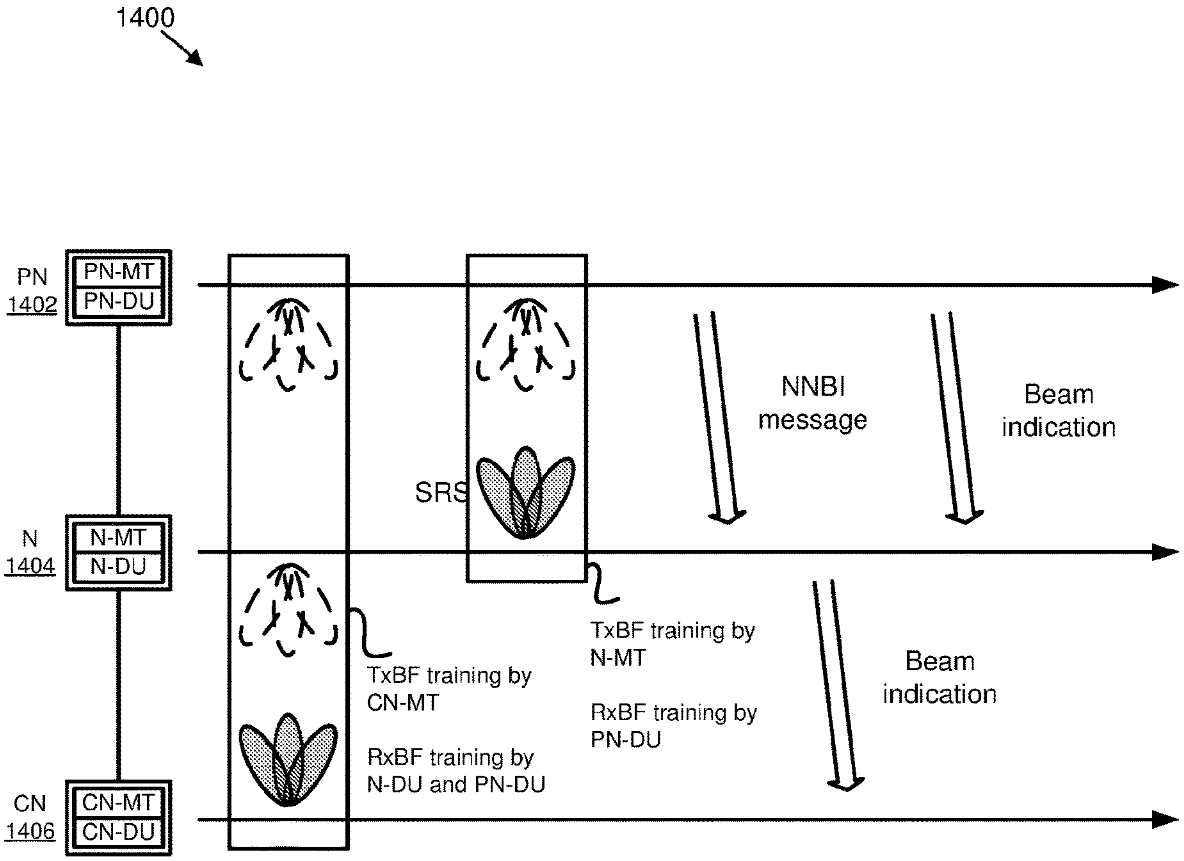
FIG. 14 is a schematic block diagram illustrating one embodiment of a system having a timeline for NNBI signaling for Case C multiplexing.

An example timeline of potential signaling is shown in FIG. 14. Specifically, FIG. 14 is a schematic block diagram illustrating one embodiment of a system 1400 having a timeline for NNBI signaling for Case C multiplexing. The system 1400 includes a PN 1402, a N 1404, and a CN 1406. In this example, PN 1402 and N 1404 may perform a first beamforming training with CN 1406, and PN 1402 may perform a second beamforming training with N 1404. The first beamforming training may be similar to the example of FIG. 12 and the second beamforming training may be similar to the example of FIG. 13.

In another embodiment, PN may transmit an NNBI message to N, wherein the NNBI message includes one or more beam indices that CN may not use because they may cause an excessive interference on PN. The beam indices may be indicated to N (e.g., by including SRS resource indicators ("SRIs") corresponding to the beam indices). Then, if N schedules an uplink channel such as a PUSCH for CN, N may indicate a beam index, such as an SRI, that is not included in the NNBI message. In this case, each of the beams indicated in the NNBI message may be referred to as unsuitable, unavailable, not available ("NA"), restricted, and so forth.

In a further embodiment, a combination of different embodiments may be used (e.g., an NNBI message may include one or more suitable/available beam indices and/or one or more unsuitable/unavailable beam indices). To realize these embodiments, PN and N may have a common interpretation of the indicated beam indices such as SRIs associated with TX beams of CN. Hence, information of beam training configurations such as SRS configurations may be shared with both PN and N such that an NNBI message by PN may be interpreted properly by N. The configurations may be delivered to PN and N by an F1 interface.

In various embodiments, information of a mapping from beam indices as understood by PN to beam indices as understood by N may be provided to either PN or N. In the former case, mapping is performed by PN before including the mapped beam indices in an NNBI message. In the latter case, mapping is performed by N after receiving an NNBI message from PN.

In certain embodiments, NNBI signaling may be realized as an availability indication for the N-CN link by PN in the spatial domain. In some realizations, an NNBI message may be realized as a beam report from PN to N.

In some embodiments, it may be determined how PN informs N that the signaling is related to simultaneous operations between the PN-N link (e.g., upstream) and the N-CN link (e.g., downstream). This may result in performance benefits.

Figure 15:
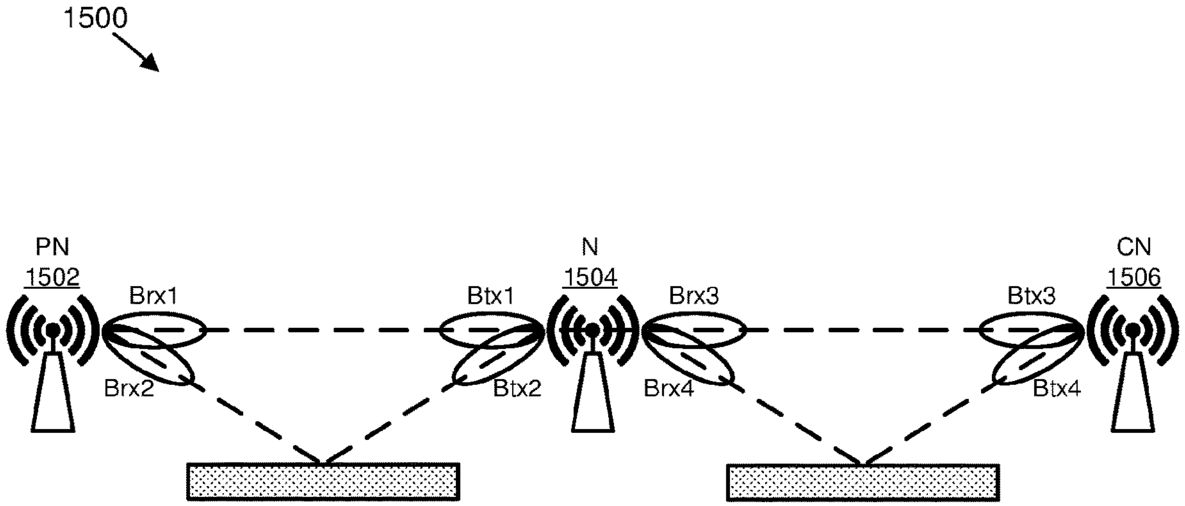
FIG. 15 is a schematic block diagram illustrating one embodiment of a system with interfering optimal beam pairs and non-interfering suboptimal beam pairs.

FIG. 15 is a schematic block diagram illustrating one embodiment of a system 1500 with interfering optimal beam pairs and non-interfering suboptimal beam pairs. The system 1500 includes a PN 1502, an N 1504, and a CN 1506. In FIG. 15, PN 1502 and N 1504 may communicate through an 'optimal' beam pair (e.g., Btx1, Brx1). Moreover, N 1504 and CN 1506 may communicate through an 'optimal' beam pair (e.g., Btx3, Brx3). An example for an optimal beam pair is one that results in the highest reference signal receive power ("RSRP") among possible combinations of transmit beams and receive beams. However, suppose those optimal beam pairs result in an interference from one link to another, particularly from Btx3 to Brx1. Hence, to realize simultaneous operations on the two links, "suboptimal" beam pairs (e.g., Btx2, Brx2) and (e.g., Btx4, Brx4) may be used for PN-N and N-CN links, respectively. These beam pairs may be suboptimal for each link, for example because they result in a lower RSRP at their respective destination node. But they may allow the two links to perform operations with smaller ICI (e.g., higher signal to interference ratio ("SIR") or higher signal to interference plus noise ratio ("SINR"). In this example, it may be intended by the proposed signaling to indicate to N 1504 that Btx3 is unsuitable and/or Btx4 is suitable, but if N 1504 does not realize that this indication from PN 1502 is only for simultaneous operations in upstream and downstream, it may continue using the suboptimal beam pair even when the optimal beam pair would not interfere with an upstream operation. Therefore, in some embodiments, PN 1502 may indicate to N 1504, explicitly or implicitly, that the suboptimal beam pair is to be used only when beneficial, e.g., when it avoids an excessive interference on the upstream link.

In certain embodiments, PN indicates to N that an NNBI message from PN is associated with a Case C multiplexing or other simultaneous operation at N. Then, N applies the beam indication constraint indicated by the NNBI message when performing the Case C multiplexing or other simultaneous operation. In this case, N may not apply the beam indication constraint when not performing the Case C multiplexing or other simultaneous operation.

For example, if a beam index associated with a TX beam of CN is indicated available by the NNBI message, and if N receives an indication from PN that the constraint is associated with a simultaneous operation at N, then N may indicate the beam index for an operation on the N-CN link if N is to perform the simultaneous operation at N, for example, if the N-CN operation is simultaneous with another operation on the PN-N link.

Similarly, if a beam index associated with a TX beam of CN is indicated unavailable by the NNBI message, and if N receives an indication from PN that the constraint is associated with a simultaneous operation at N, then N may not indicate the beam index for an operation on the N-CN link if N is to perform the simultaneous operation at N, for example, if the N-CN operation is simultaneous with another operation on the PN-N link. However, if N is not to perform the simultaneous operation, it may use the beam index for an operation on the N-CN link.

Here, an operation in the upstream (e.g., PN-N link) may be an uplink transmission such as a PUSCH scheduled by the PN, a configured-grant PUSCH ("CG-PUSCH") configured by an IAB-CU, a PUCCH, an SRS, or the like. Similarly, an operation in downstream (e.g., N-CN link) may be an uplink transmission such as a PUSCH scheduled by the N, a CG-PUSCH configured by an IAB-CU, a PUCCH, an SRS, or the like.

In some embodiments, N may determine, without an explicit indication by PN, that a beam indication constraint indicated by an NNBI message is associated with a Case C multiplexing or other simultaneous operation. Then, N applies the beam indication constraint indicated by the NNBI message when performing the Case C multiplexing or other simultaneous operation. In this case, N may not apply the beam indication constraint when not performing the Case C multiplexing or other simultaneous operation.

For example, if a beam index associated with a TX beam of CN is indicated available by the NNBI message, and if N may determine that the constraint is associated with a simultaneous operation at N, then N may indicate the beam index for an operation on the N-CN link if N is to perform the simultaneous operation at N, for example, if the N-CN operation is simultaneous with another operation on the PN-N link.

Similarly, if a beam index associated with a TX beam of CN is indicated unavailable by the NNBI message, and if N may determine that the constraint is associated with a simultaneous operation at N, then N may not indicate the beam index for an operation on the N-CN link if N is to perform the simultaneous operation at N, for example, if the N-CN operation is simultaneous with another operation on the PN-N link. However, if N is not to perform the simultaneous operation, it may use the beam index for an operation on the N-CN link.

Such embodiments may be understood as an implicit indication rather than an explicit indication by PN. This implicit determining may be specified by a standard or indicated by a configuration. For example, an IAB-CU configuration may indicate to N that a beam index, associated with a TX beam of CN, which is indicated available or unavailable by an NNBI message may or may not be used, respectively, for an operation on the N-CN link when an uplink operation, or other operation, is to be performed on the PN-N link.

In various embodiments, there are multiple child nodes that impose different spatial constraints. Consider the example illustrated in FIG. 16.

Figure 16:
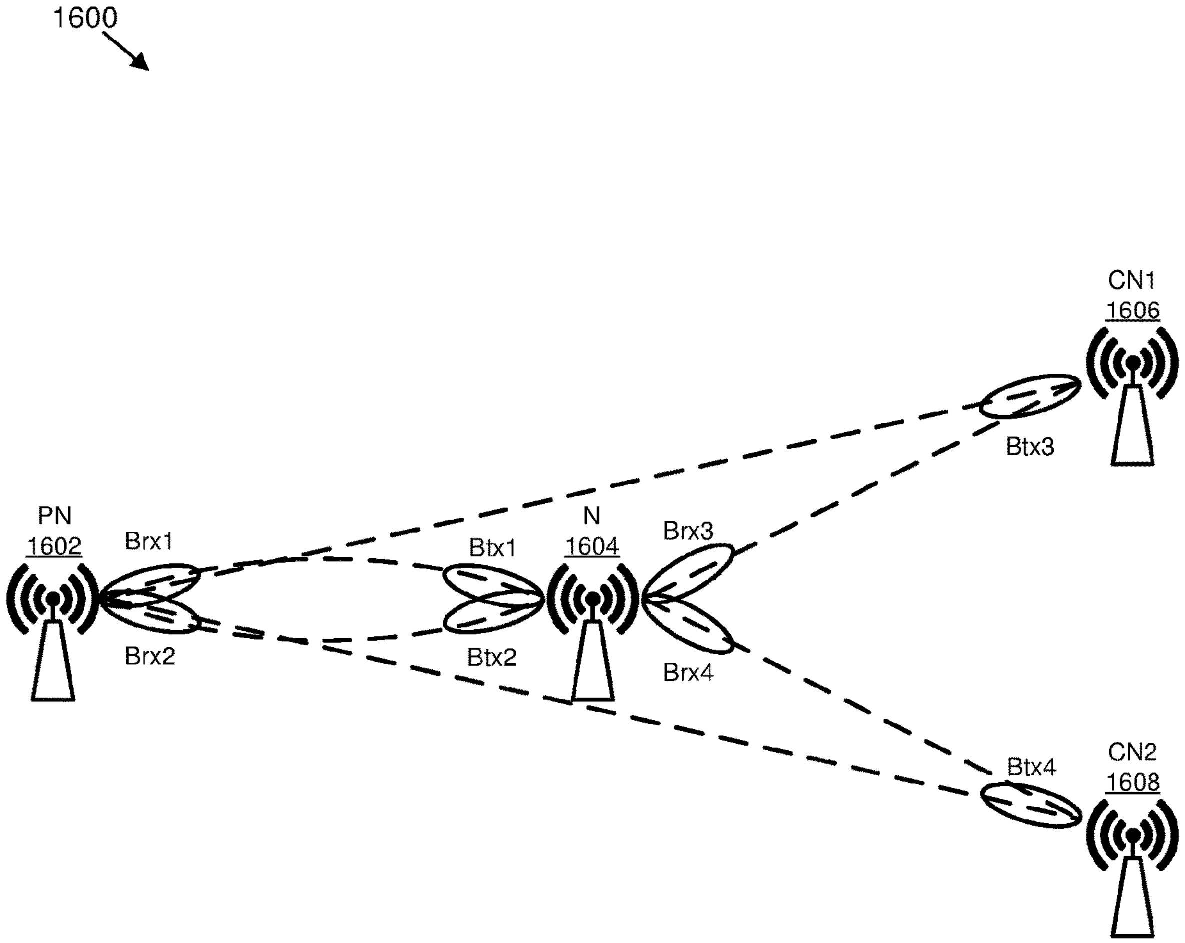
FIG. 16 is a schematic block diagram illustrating one embodiment of a system with an interfering beam from multiple nonadjacent nodes.

FIG. 16 is a schematic block diagram illustrating one embodiment of a system 1600 with an interfering beam from multiple nonadjacent nodes. The system 1600 includes a PN 1602, an N 1604, a first CN 1606 (CN1), and a second CN 1608 (CN2). In this example, N 1604 has parent node PN 1602 and two child nodes CN1 1606 and CN2 1608. For Case C multiplexing, N 1604 may use a first antenna panel for transmitting an uplink signal to PN 1602 and use a second antenna panel to receive an uplink signal from CN1 1606 and/or CN2 1608. In this example: 1) PN 1602 may use either of beam pairs (e.g., Btx1, Brx1 or Btx2, Brx2) to receive an uplink signal from N 1604: 2) N 1604 may use a beam pair (e.g., Btx3, Brx3) to receive an uplink signal from CN1 1606 or a beam pair (e.g., Btx4, Brx4) for receiving a signal from CN2 1608. In this example, the beam pair for an operation on the N-CN1 link may interfere with the beam pair (e.g., Btx1, Brx1), and similarly, the beam for an operation on the N-CN2 link may interfere with the beam pair (e.g., Btx2, Brx2). The issue with this example is that, since both Btx3 and Btx4 interfere with PN 1602, PN 1602 may transmit NNBI messages to N 1604 indicating that Btx3 and Btx4 are unavailable. That may result in an underperformance by N 1604 because PN 1602 may use only one of the two possible beam pairs for receiving a signal from N 1604 at a time, and in either case, N 1604 may receive a signal from a child node that does not cause an excessive interference on PN 1602.

In one embodiment, PN may indicate to N that an NNBI message is associated with a child node identifier ("ID") such as an ID of CN1 or an ID of CN2.

In another embodiment, N may determine, without an explicit indication by PN, whether a beam index is associated with a child node ID such as an ID of CN1 or an ID of CN2. For example, if an NNBI message from PN is associated with a beam training on reference signals or resources associated with reference signals that are associated with CN1, then N may determine that the NNBI message is associated with CN1. Similarly, if an NNBI message from PN is associated with a beam training on reference signals or resources associated with reference signals that are associated with CN2, then N may determine that the NNBI message is associated with CN2. If an NNBI message from PN is associated with a beam training on reference signals or resources associated with reference signals that are associated with either or both of CN1 and CN2, then N may determine that the NNBI message is associated with either or both of CN1 and CN2.

In yet another embodiment. N may receive NNBI messages associated with CN1 and CN2, wherein the NNBI messages additionally include indication of time and/or frequency resources (e.g., symbols, slots, subframes, physical resource blocks ("PRBs"), resource block groups ("RBGs"), or the like). Then, N may apply the nonadjacent-node beam indication information as explained earlier for beam/SRI indication to CN1 and/or CN2 on the indicated resources. For example, if a beam B1 associated with CN1 is indicated suitable/available for a resource R1 and a beam B2 associated with CN2 is indicated suitable/available for a resource R2, then N may indicate beam B1 for an operation on the N-CN1 link on resource R1, and N may indicate beam B2 for an operation on the N-CN2 link on resource R2.

In certain embodiments, it may be determined how to inform PN that a beam index is subject to NNBI signaling.

In one embodiment, PN receives a configuration indicating that a beam index associated with an SRS associated with a child node of a child node of PN, here CN or a UE, may be indicated available or unavailable by NNBI signaling. Upon receiving the indication, PN may perform measurements on the SRS and transmit an NNBI message to the parent node of CN or the UE, here N, wherein the NNBI may indicate that a beam associated with the SRS is available or unavailable.

In another embodiment, PN may receive such indication from N rather than an IAB-CU.

In yet another embodiment, PN may determine without an explicit configuration that a beam index associated with an SRS associated with a child node of a child node of PN, here CN or a UE, may be indicated available or unavailable by NNBI signaling. In this case, upon receiving an SRS configuration associated with a child node of a child node of PN, here CN or a UE, PN may perform measurements on the SRS and transmit an NNBI message to the parent node of CN or the UE, here N, wherein the NNBI may indicate that a beam associated with the SRS is available or unavailable.

In some embodiments, PN may determine that a beam index associated with an SRS associated with a child node of a child node of PN, here CN or a UE, is subject to NNBI signaling upon receiving a signaling from the parent node of CN or the UE, here N, that N is capable of performing simultaneous operations. The capability may be long-term, for example based on a hardware capability of N such as a number of antenna panels or a number of inverse fast Fourier transform ("FFT") ("IFFT") and/or FFT windows for OFDM processing, and/or it may be short-term, for example, based on a total power constraint, a power imbalance constraint, a beam/spatial constraint, a timing alignment constraint, an interference constraint, or the like.

In various embodiments, PN may determine that a beam index associated with a first SRS associated with CN is subject to NNBI signaling to N if the first SRS is configured on resources that are time-overlapping ("TOL") with a second SRS associated with N. This method may be particularly effective at indicating which TX beams of CN may be indicated available or unavailable, via NNBI signaling, such that spatial constraints at N are met. When CN transmits the first SRS, both PN and N may perform a measurement on the first SRS for beam training. Since the second SRS is time-overlapping with the first SRS, if N transmits the second SRS, it may be implied by PN that N is capable of enhanced duplexing, here listening to an uplink signal from CN and transmitting an uplink signal to PN. The enhanced duplexing may be enabled by two antenna panels or a full-duplex antenna. This, of course, requires a knowledge of a capability of N to perform enhanced duplexing, which may be realized by a capability signaling from N to the IAB-CU that configures the first SRS for CN and the second SRS for N.

In various embodiments, there may be an association with SRS of N and SRS of CN. It was shown in FIG. 14 that PN may perform a first beamforming training with CN and a second beamforming training with N. Each beamforming training step may include a "beam sweeping" on transmitter and/or receiver sides. For example, in FIG. 14, suppose the first beamforming training is similar to the example of FIG. 12 and the second beamforming training is similar to example of FIG. 13. We may observe that PN (e.g., PN-DU) applies similar RX beams for beam training with CN (e.g., CN-MT) in the first step and with N (e.g., N-MT) in the second step. This behavior may be indicated to PN.

In one embodiment, PN receives a configuration of an NNBI message, the configuration includes indications of a first configuration of SRS associated with CN and a second configuration of SRS associated with N, wherein the first configuration may include an indication of a first SRS resource set and the second configuration may include an indication of a second SRS resource set, and resources in the first and second resource sets are resource-wise spatially associated. This association may imply that PN should apply similar receive beams (e.g., RX spatial filters) when performing beam training on resources of the first and second SRS resource sets.

In one example, the resource-wise spatial association between SRS resources in the first and second SRS resource sets may be based on the chronological order of the resources (e.g., the earliest SRS resource in the first SRS resource set and the earliest SRS resource in the second SRS resource set are associated, the second earliest SRS resource in the first SRS resource set and the second earliest SRS resource in the second SRS resource set are associated, and so forth).

In another example, the resource-wise spatial association between SRS resources in the first and second SRS resource sets may be based on the order the SRS resource IDs appear in the configurations. Particularly, the abstract syntax notation 1 ("ASN.1") code for an SRS resource ID list in an SRS resource set may be as shown in Table 3.

TABLE 3

```
srs-ResourceIdList  SEQUENCE (SIZE(1..maxNrofSRS-ResourcesPerSet)) OF SRS-
ResourceId OPTIONAL, -- Cond Setup
```

In this example, the SRS resource associated with the first SRS-ResourceId in the srs-ResourceIdList in the first SRS resource set may be spatially associated with the SRS resource associated with the first SRS-ResourceId in the srs-ResourceIdList in the second SRS resource set, the SRS resource associated with the second SRS-ResourceId in the srs-ResourceIdList in the first SRS resource set may be spatially associated with the SRS resource associated with the second SRS-ResourceId in the srs-ResourceIdList in the second SRS resource set, and so forth.

In one realization, an indication that the SRS resource sets are spatially associated may be included in a configuration such as an NNBI configuration. In another realization, an indication may be included in a configuration of the first SRS resource set or the second SRS resource set. In yet another realization, the indication may be included in a control signaling (e.g., a control message from N). This dynamic signaling may be helpful for dynamic environments or scenarios such as mobile IAB.

In various embodiments, there may be one-shot beam training. In certain embodiments, CN transmits SRS on certain resources while N and PN perform channel and interference measurements. N also transmits SRS on other resources while PN performs channel measurements (e.g., if the resources used for SRS of CN and N are on different time resources, i.e., time-division multiplexed ("TDM ed").

Figure 17:
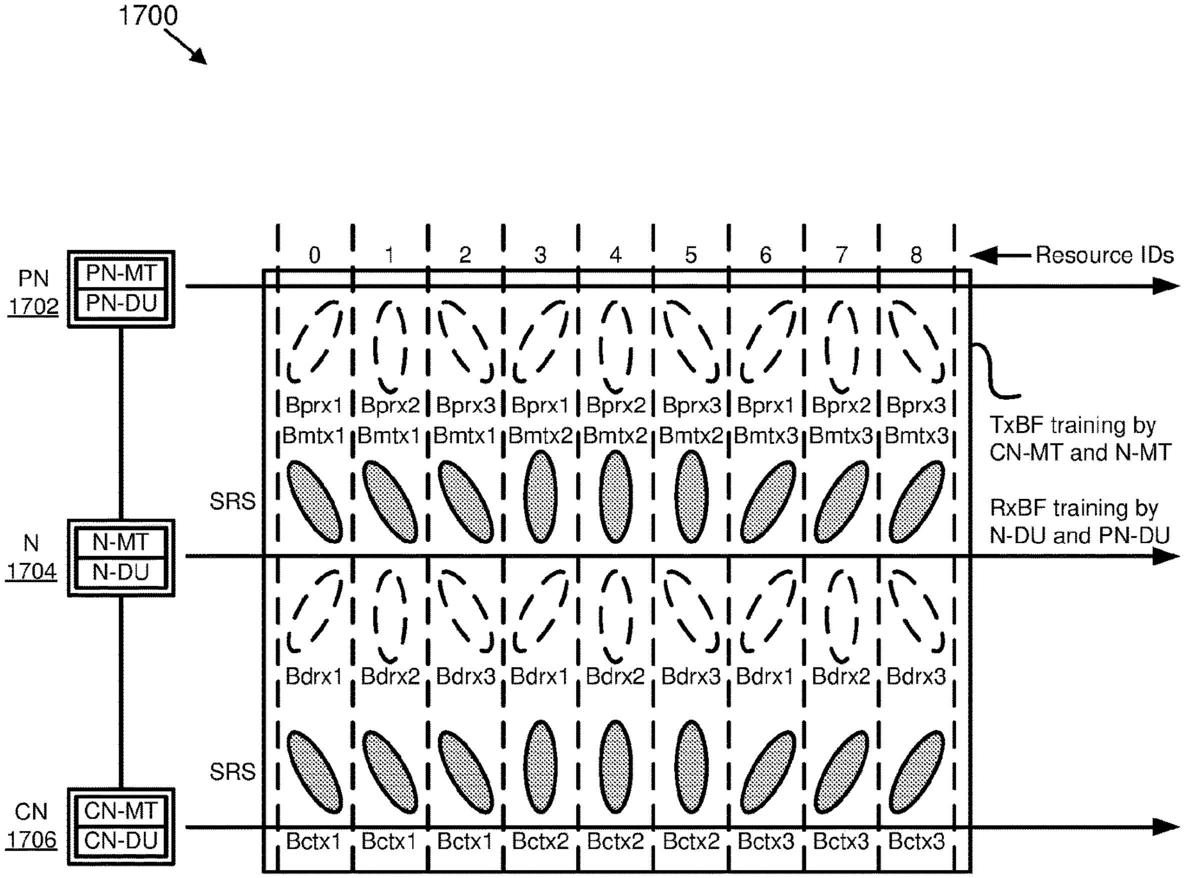
FIG. 17 is a schematic block diagram illustrating one embodiment of a system for simultaneous SRS transmission for beam training.

In certain embodiments, SRS transmission and measurements may be performed on time-overlapping resources as shown in FIG. 17.

FIG. 17 is a schematic block diagram illustrating one embodiment of a system 1700 for simultaneous SRS transmission for beam training. The system 1700 includes a PN 1702, a N 1704, and a CN 1706.

In one embodiment, CN and N transmit SRS on the same symbols (or otherwise, on time-overlapping resources). CN and N may perform transmit-beamforming ("TxBF") when transmitting the SRS for the purpose of beam training. N and PN may receive beamforming ("RxBF") for channel and interference measurements on the SRS. Since N transmits SRS and performs measurements simultaneously, it is expected to have a full-duplexing or multi-panel capability that allows N to perform simultaneous operations. Next, PN may indicate an uplink transmit beam to N through an SRI indication or spatial relation information parameter. This beam indication signaling, however, also indicates a transmit beam for CN that may cause a smaller interference compared to other CN transmit beams. One issue with this embodiment may be that the beam indicated for CN may not be a good beam (e.g., in terms of received signal power) for the N-CN link.

Therefore, in another embodiment, PN may transmit a control message (e.g., an NNBI message) including multiple beam indications, wherein each beam indication may indicate a beam from N and a beam from CN, wherein the SIR or SINR from the combination of the beams from N and CN is acceptable (e.g., above a threshold). That is, each beam indication from the beam indications indicates a beam from N that provides a sufficiently large signal strength received at PN, and the beam indication indicates a beam from CN that does not cause an excessive interference. Each beam indication in the beam indications may indicate a resource index such as an SRS resource indicator. Then, N may transmit a control message, called NNBI acknowledgement ("NNBI-ACK") message that selects one of multiple of the beam indications from the beam indications in the NNBI message.

In one realization of this embodiment, the beam indications is determined based on comparing the SIR or SINR of the signal and interference from N and CN, respectively, with a threshold. This realization may be based on an implementation of PN or a specification by a standard. In the latter case, the threshold may be an IAB node capability of PN, may be configured by an IAB-CU, and/or may be signaled by another IAB node such as N.

Figure 18:
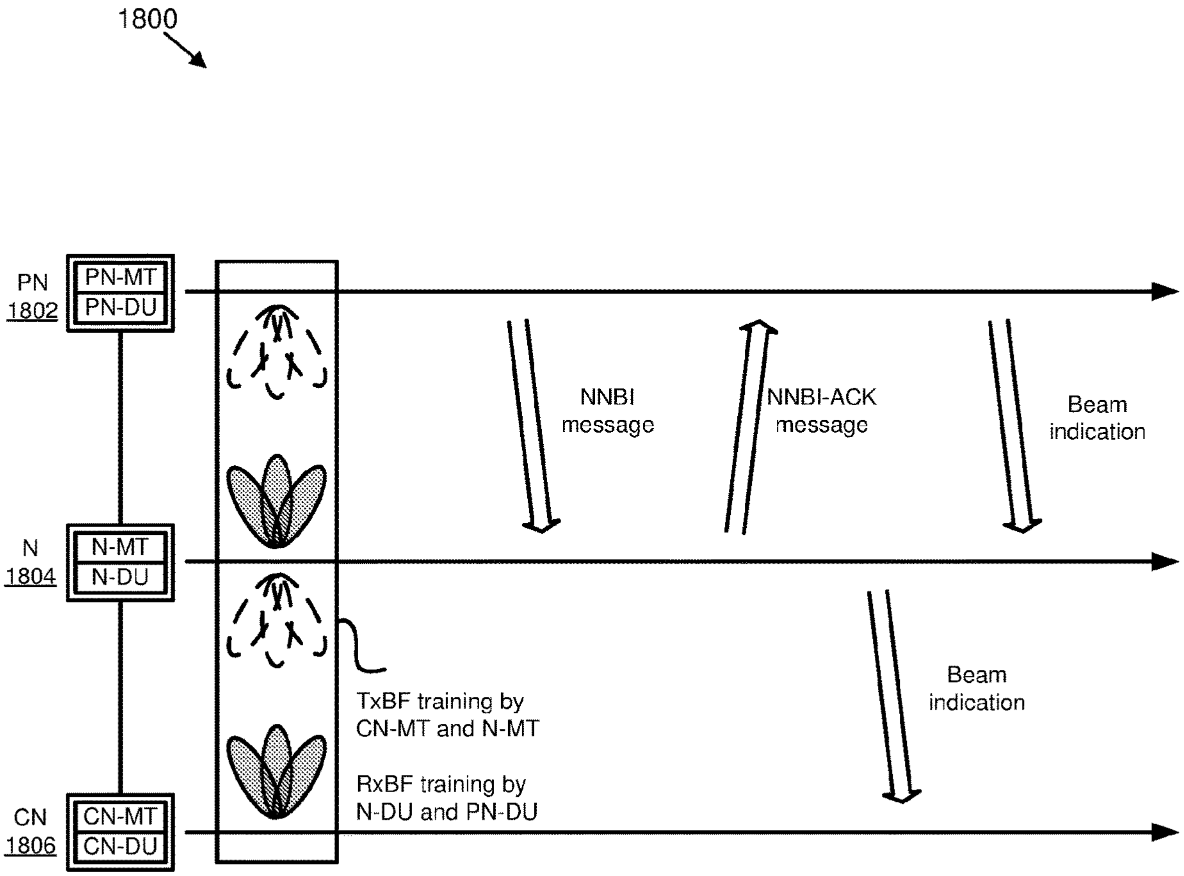
FIG. 18 is a schematic block diagram illustrating one embodiment of a system having a timeline for NNBI signaling based on one-shot beam training.

One example based on a one-shot beam training is shown in FIG. 18.

FIG. 18 is a schematic block diagram illustrating one embodiment of a system having a timeline for NNBI signaling based on one-shot beam training. The system 1800 includes a PN 1802, a N 1804, and a CN 1806. In this example, PN 1802 may receive a configuration of NNBI signaling comprising indication of SRS configurations associated with N 1804 and CN 1806. The beam training step may be performed as show in FIG. 17. By performing channel and interference measurements on SRS from N 1804 and CN 1806, respectively, PN 1802 may obtain multiple beams/resources that provide a sufficiently high SIR or SINR. Then, PN 1802 may transmit information of the beam/resources in an NNBI message to N 1804.

For example, suppose that PN 1802 indicates the following beam combinations by the NNBI message to N 1804: 1) resource ID 0 for signal and resource ID 6 for interference: 2) resource ID 6 for signal and resource ID 0 for interference: and/or 3) resource ID 3 for signal when no interference. Based on the indications, N 1804 may determine, respectively, that: 1) the combination of Bmtx1 (e.g., associated with resource IDs 0, 1, 2) from N 1804 and Bctx3 (e.g., associated with resource IDs 6, 7, 8) is suitable: 2) the combination of Bmtx3 (e.g., associated with resource IDs 6, 7, 8) from N 1804 and Bctx1 (e.g., associated with resource IDs 0, 1, 2) is suitable; and/or 3) Bmtx2 (e.g., associated with resource IDs 3, 4, 5) is suitable if there is not interference from CN 1806. Then, N 1804 may transmit an NNBI-ACK message including an acknowledgement for the first and third combination, but not the second combination. For example, the NNBI-ACK message may include a bitmap "101", wherein a 'I' indicates that the associated beam combination indication is accepted and a '0' indicates that the associated beam combination indication is not accepted. Next, PN 1802 may indicate a beam to N 1804 for an uplink transmission, wherein the beam may be based on the said accepted beam combinations. If PN 1802 indicates Bmtx1 for an uplink transmission by N 1804 such as a PUSCH, then, based on the first beam combination indication, N 1804 may indicate Bctx3 to CN 1806 for another uplink transmission such as another PUSCH. However, if PN 1802 indicates Bmtx2 for an uplink transmission by N 1804 such as a PUSCH, then, based on the third beam combination indication, N 1804 may not schedule another uplink transmission such as another PUSCH for CN 1806.

In one realization of this example, PN may not refrain from indicating Bmtx3 to N because the beam indication combination was not accepted by N (e.g., as indicated in the NNBI-ACK) message.

In another realization, the NNBI-ACK message may not mandate a behavior by PN, and, hence, PN may still indicate Bmtx3 to N for an uplink transmission to N. In this case, since the second combination was not accepted by N, possibly because of a small received signal strength through Bctx1 or because of a high self-interference, N may refrain from scheduling another uplink transmission for CN and/or may cancel an uplink transmission for CN. Alternatively, PN may indicate to N which CN beams (for the N-CN link) may allow a weak interference, hence indicating the beams available/suitable.

In some embodiments, there may be methods with channel reciprocity.

In various embodiments, Case C multiplexing includes an uplink transmission and an uplink reception, respectively, by an IAB-MT and an IAB-DU of an IAB node. Certain embodiments may use downlink reference signals and channel reciprocity or beam correspondence.

In one embodiment, PN may transmit downlink reference signals ("DL-RS"), such as CSI-RS or SS/PBCH blocks, and N and CN perform measurements on the DL-RS. Similarly, N may transmit DL-RS such as CSI-RS or SS/PBCH blocks, and CN performs measurements on the DL-RS. Then, CN may transmit a CSI report based on measurements on DL-RS from N and an interference report based on measurements on DL-RS from PN. Next, based on the received reports and its own measurements on DL-RS from PN, N may transmit a beam report to PN that indicates to PN which beams allow a strong signal at N while causing small interference on CN. Finally, based on the reports from CN and N, N and PN may select corresponding uplink beams for uplink transmissions (e.g., according to a Case C multiplexing at N). An example timeline of this method is shown in FIG. 19.

Figure 19:
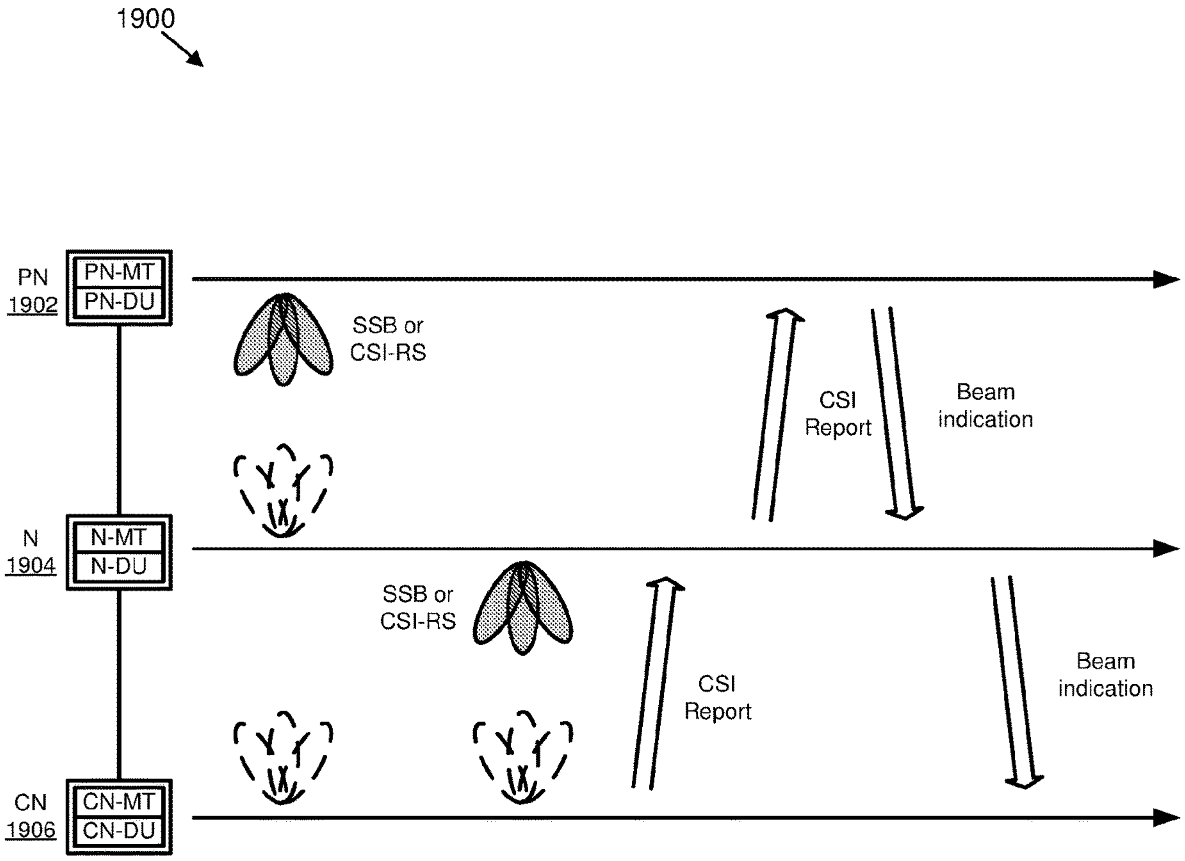
FIG. 19 is a schematic block diagram illustrating one embodiment of a system for beam training for Case C multiplexing based on channel reciprocity and beam correspondence.

FIG. 19 is a schematic block diagram illustrating one embodiment of a system 1900 for beam training for Case C multiplexing based on channel reciprocity and beam correspondence. The system 1900 includes a PN 1902, a N 1904, and a CN 1906. To realize this method based on channel reciprocity and beam correspondence, any or all of PN 1902, N 1904, and CN 1906 may have a beam correspondence capability.

It can be seen from the example timeline of FIG. 19 of the proposed NNBI signaling that N should receive the NNBI message from PN first before producing and transmitting an SRI indication to CN. The time required for N to receive and decode the NNBI message, encode an SRI indication, and transmit the SRI indication may be determined by a capability of N. Information of this capability may be communicated with the IAB-CU and/or PN to apply appropriate timing.

In one embodiment, N informs PN of a minimum time that N requires to receive and decode the NNBI message, encode an SRI indication, and transmit the SRI indication. Then, PN does not expect to experience a reduced interference according to the NNBI signaling prior to the minimum time. In another embodiment, once N receives an NNBI message, it refrains from performing an operation on the N-CN link until decoding the NNBI message is complete.

In various embodiments, during a beam training between CN and PN, for example when CN transmits SRS and PN performs measurements on the SRS, timing alignment may be an issue. In particular, the issue is that none of the timing alignment approaches that are currently being discussed for enhanced IAB ("eIAB") systems, including TX timing alignment (e.g., Case-6) and RX timing alignment (e.g., Case-7) may guarantee that the SRS reception at PN is aligned with other signal receptions.

In some embodiments that PN performs measurements on SRS from CN and N simultaneously, there may be a smaller number of degrees of freedom.

In various embodiments, CN aligns its SRS transmission timing such that it fulfills a reception timing constraint at PN. For example, CN may obtain propagation timing based on measurements on SS/PBCH from PN-DU, signaling between PN and N, and/or signaling between N and CN. The signaling may be similar to timing advance signaling and/or IAB timing alignment signaling.

In certain embodiments, Case D multiplexing at an IAB node N is realized when an IAB-MT of N (e.g., N-MT) receives a downlink signal from a parent node PN (e.g., PN-DU) and an IAB-DU of N (e.g., N-DU) transmits a downlink signal from a child node CN (e.g., CN-MT) or a UE. Other than a self-interference that may be caused by the IAB-DU transmission on the IAB-MT reception, the downlink transmission by PN may also cause an inter-cell interference ("ICI") on CN. This interference may be more likely than a generic interference between two IAB nodes in a vicinity because CN performs receive beamforming towards N to receive the signal from the IAB-DU of N, and if PN happens to be in the vicinity of N, it is likely that the receive beam by CN captures a strong signal from PN as well.

In some embodiments, PN transmits DL reference signals such as CSI-RS or SS/PBCH blocks ("SSBs") through multiple beams. N performs measurements on the reference signals. CN also performs measurements on the reference signals and transmits one or multiple CSI reports, including an interference report based on interference measurements on CSI-RS/SSBs from PN and a channel report based on channel measurements on CSI-RS/SSBs from N. Next, having received the one or more CSI reports from CN, N may transmit a CSI report to PN based on channel measurements on the CSI-RS/SSBs from PN. Then, PN and N may indicate beams for downlink transmissions for N and CN, respectively (e.g., PDSCH transmissions). A beam indication for downlink may be a TCI state indication.

Figure 20:
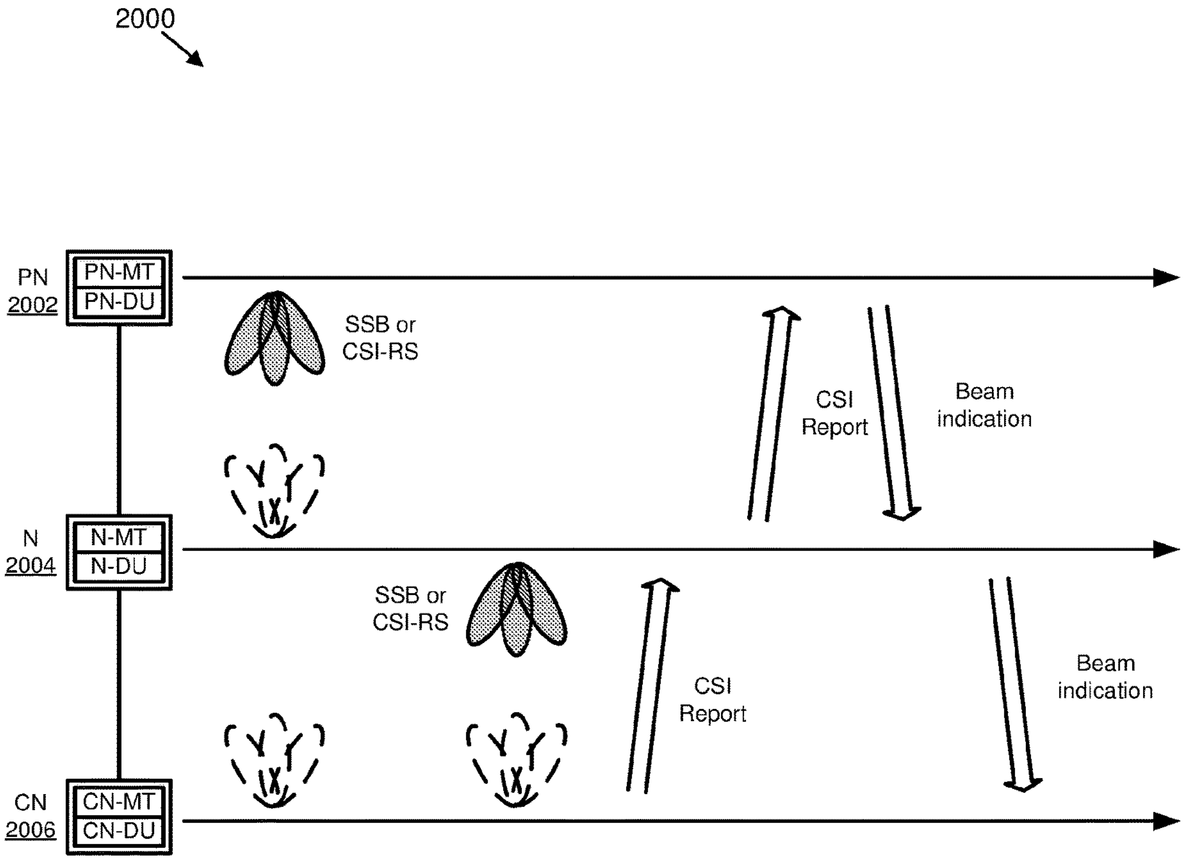
FIG. 20 is a schematic block diagram illustrating one embodiment of a system for beam training for Case D multiplexing.

FIG. 20 is a schematic block diagram illustrating one embodiment of a system 2000 for beam training for Case D multiplexing. The system 2000 includes a PN 2002, a N 2004, and a CN 2006. In some realizations, the beam indication from N to CN may be based on the beam indication from PN to N similar to the methods explained for uplink transmissions for Case C multiplexing.

It can be seen in FIG. 20 that a method for beam training for Case D multiplexing may be similar to beam training for Case C multiplexing with channel reciprocity (e.g., beam correspondence). Therefore, in some realizations, a beam training may be performed, and then one or more CSI reports including results of channel and/or interference measurements may be used for either or both of simultaneous uplink operations (e.g., Case C) and simultaneous downlink operations (e.g., Case D).

In certain embodiments, Case A multiplexing at an IAB node N is realized when an IAB-MT of N (e.g., N-MT) transmits a uplink signal to a parent node PN (e.g., PN-DU) and an IAB-DU of N (e.g., N-DU) transmits a downlink signal from a child node CN (e.g., CN-MT) or a UE. The transmissions may cause cross-link interference ("CLI") on CN-MT and PN-DU, respectively.

In some embodiments, N transmits DL reference signals such as CSI-RS or SS/PBCH blocks ("SSBs") through multiple beams. N additionally transmits UL reference signals such as SRS through multiple beams. PN and CN perform measurements on the DL and UL reference signals, the measurements including channel and/or interference measurements as follows: 1) PN performs channel measurements on the SRS and performs interference measurement on the CSI-RS/SSBs: and/or 2) CN performs channel measurements on the CSI-RS/SSBs and performs interference measurement on the SRS. CN may then transmit a CSI report to N informing N which DL beams from N-DU provide a strong received signal power at CN-MT, and/or which UL beams from N-MT cause a weak or strong interference on CN-MT. PN may then transmit a beam indication to N, wherein the beam indication may include information of an N-MT beam for an uplink transmission for N. The beam indication may indicate, explicitly or implicitly, which N-DU beams are suitable or unsuitable for a downlink transmission by N-MT. An implicit indication may be realized, for example, by indicating a strong interference on a resource ID associated with N-MT, and then N may determine that a downlink beam associated with a resource of N-DU that is time-overlapping ("TOL") with the resource ID is suitable or unsuitable. For this purpose, the CSI-RS/SSBs and the SRS may be configured on same or time-overlapping resources. Then, based on the CSI report from CN and beam indication from PN, N may schedule a DL channel and indicated a DL beam (e.g., a TCI state) for CN.

Figure 21:
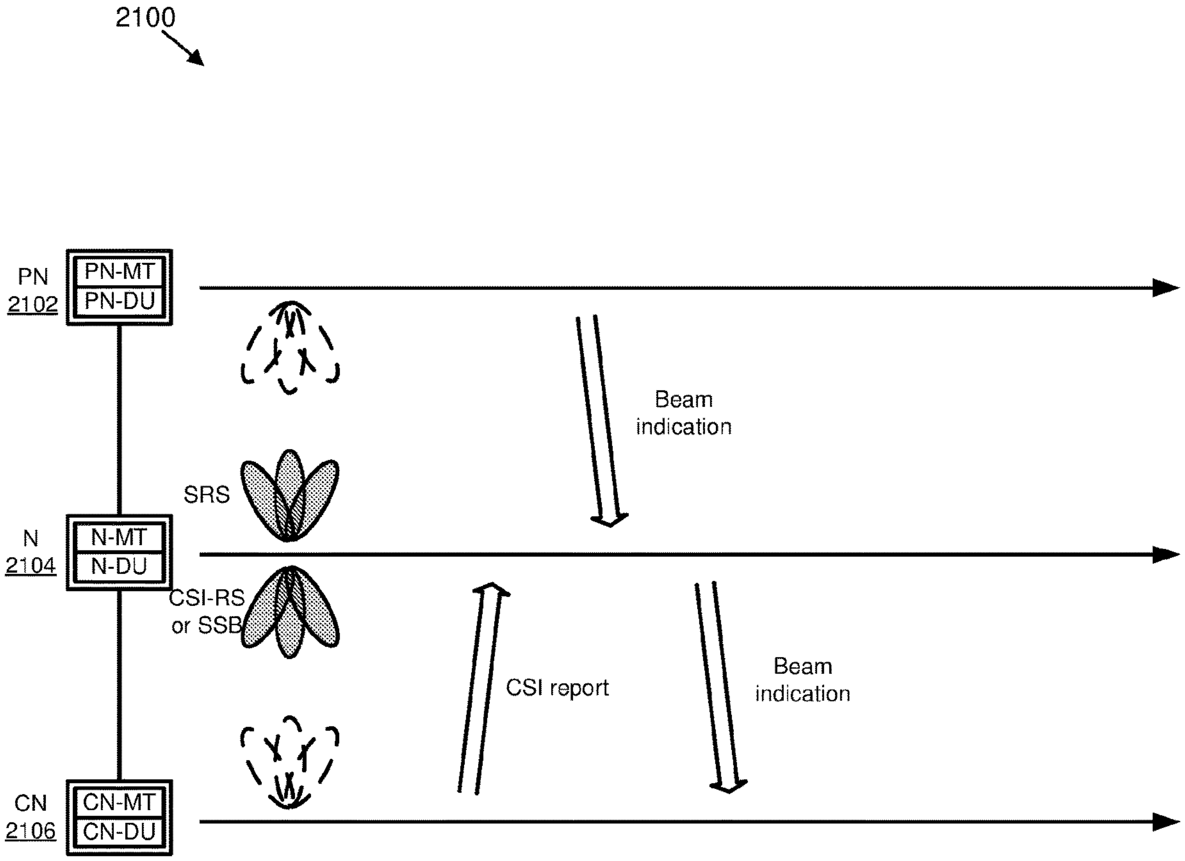
FIG. 21 is a schematic block diagram illustrating one embodiment of a system for beam training for Case A multiplexing.

An example timeline is shown in FIG. 21. FIG. 21 is a schematic block diagram illustrating one embodiment of a system 2100 for beam training for Case A multiplexing. The system 2100 includes a PN 2102, a N 2104, and a CN 2106. In this example, transmission of CSI-RS/SSBs, SRS and the corresponding channel and interference measurements by CN 2106 and PN 2102 may be performed on time-overlapping or non-time-overlapping resources.

In various embodiments, Case B multiplexing at an IAB node N is realized when an IAB-MT of N (e.g., N-MT) receives a downlink signal from a parent node PN (e.g., PN-DU) and an IAB-DU of N (e.g., N-DU) receives an uplink signal from a child node CN (e.g., CN-MT) or a UE. The two signals from PN and CN may cause cross-link interference on N-DU and N-MT, respectively.

In certain embodiments, PN transmits DL reference signals such as CSI-RS or SS/PBCH blocks ("SSBs") through multiple beams. CN additionally transmits UL reference signals such as SRS through multiple beams. N performs measurements on the DL and UL reference signals, the measurements including channel and/or interference measurements as follows: 1) N-DU performs channel measurements on the SRS and performs interference measurement on the CSI-RS/SSBs: and/or 2) N-MT performs channel measurements on the CSI-RS/SSBs and performs interference measurement on the SRS. N may then transmit a CSI report to PN informing PN which DL beams from PN-DU provide a strong received signal power at N-MT, and/or which DL beams from PN-DU cause a weak or strong interference on N-DU. PN may then transmit a beam indication to N, wherein the beam indication may include information of a beam indicated for a downlink transmission. An example may be an indication of a TCI state for a PDSCH. Then, having performed channel and interference measurements and having received the beam indication from PN, N may schedule an uplink transmission such as a PUSCH and indicate a beam for CN.

Figure 22:
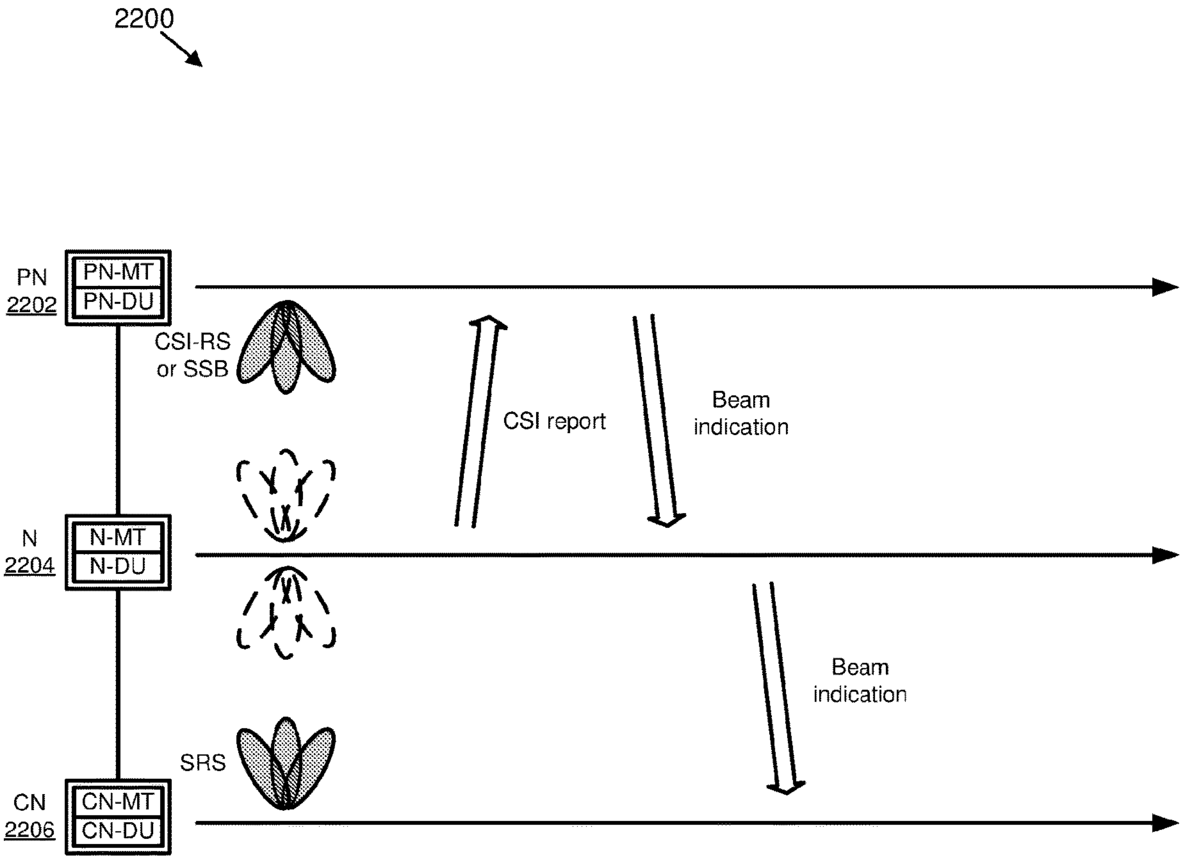
FIG. 22 is a schematic block diagram illustrating one embodiment of a system for beam training for Case B multiplexing.

An example timeline is shown in FIG. 22. FIG. 22 is a schematic block diagram illustrating one embodiment of a system 2200 for beam training for Case B multiplexing. The system 2200 includes a PN 2202, a N 2204, and a CN 2206. In this example, transmission of CSI-RS/SSBs, SRS, and the corresponding channel and interference measurements by N may be performed on time-overlapping or non-time-overlapping resources.

In various embodiments, a process of beam training for Case C multiplexing with channel reciprocity (e.g., beam correspondence) is similar to the process of beam training for Case D multiplexing, as these scenarios are dual of each other in terms of the direction of transmission and reception of signals. By extension, a similar relationship may apply to beam training with channel reciprocity for Case A and Case B multiplexing. Furthermore, each downlink beam training step may be individually realized by an uplink beam training step, and vice versa, provided that the nodes/devices involved in the process have the capability/feature of transmit-receive beam correspondence and/or an uplink-downlink channel reciprocity holds.

For example, if it is desired to perform all beam training steps in downlink, an uplink beam training (e.g., possibly followed by signaling such as an NNBI signaling) may be replaced by a downlink beam training (e.g., possibly followed by a CSI reporting). Conversely, if it is desired to perform all beam training steps in uplink, a downlink beam training (e.g., possibly followed by CSI reporting) may be replaced by an uplink beam training (e.g., possibly followed by signaling such as NNBI signaling). In each example, further CSI reporting and beam indication steps may follow as explained earlier for methods and example realizations.

In certain embodiments, configurations and signaling described herein may include parameters indicating a beam applied for a transmission or a reception, a transmission power to apply for a transmission, a timing alignment method applied for a transmission or a reception, and so forth. Moreover, a beam may refer to a spatial filter for a transmission or a reception by a node on an antenna panel or antenna port.

In some embodiments, a beam may be referred to by a term such as a spatial filter or spatial parameters. A transmission and/or reception of a signal with a beam may refer to application of a spatial filter (or spatial parameters) similar to that of another transmission and/or reception of another signal. "Determining" a beam may follow a beamforming training process including transmission and/or reception of reference signals by applying different beams and performing measurements on the signals. "Indicating" a beam may refer to transmitting a message to another node, the message including information of a beam/spatial filter in the form of a transmission configuration indication ("TCI") including a spatial quasi collocation ("QCL") or QCL Type D, a spatial relation parameter, or the like.

In various embodiments, a transmission power may be determined or indicated by signaling. The signaling may be semi-static such as by an RRC configuration and/or a control message such as a MAC CE message or a DCI/L1 message. Transmission power control may be applied to uplink transmissions, downlink transmissions, or both, which may be determined by the standard, a configuration, and/or a control signaling.

In certain embodiments, a timing alignment method may be determined or indicated by signaling. The signaling may be semi-static such as by an RRC configuration and/or a control message such as a MAC CE message or a DCI/L1 message. In some embodiments, a timing alignment method may be determined by a duplexing/multiplexing case. For example, Case A (e.g., simultaneous transmission) at a node may automatically trigger a timing alignment mode based on "Case-6" timing alignment, where transmissions are aligned, whereas Case B (e.g., simultaneous reception) at a node may automatically trigger a timing alignment mode based on "Case-7" timing alignment, where receptions are aligned. Whether and how a timing alignment method is triggered or applied may be determined by the standard, a configuration, and/or a control signaling.

In various embodiments, a parameter among the above may be determined based on another parameter. For example, a power control parameter or a timing alignment method/parameter may be determined based on a beam index such as a reference signal resource indicator.

In certain embodiments, configurations may be RRC configurations that an IAB node (or a UE) may receive from an IAB-CU. The configurations may include parameters for reference signals such as resources allocated for the reference signals, signaling to trigger transmission of a reference signal, beam/spatial relations and transmission power, and so forth.

In some embodiments, a reference signal for an interference evaluation may be any reference signal based on which an interference may be measured. For example, a channel state information reference signal ("CSI-RS") may be used for downlink (e.g., when interference by an IAB-DU is to be measured), while a sounding reference signal ("SRS") may be used for uplink (e.g., when interference by an IAB-MT or a UE is to be measured). Other types of reference signals are not precluded. Once a reference signal is transmitted, it can be received by other nodes (e.g., IAB nodes or UEs) to measure a reference signal receive power ("RSRP"), a reference signal reception quality ("RSRQ"), or the like. An alternative to a reference signal may be any other transmission based on which an interference or a received signal power such as a received signal strength indicator ("RSSI") may be computed.

Various types of reference signals may be specified for new radio ("NR"), which may be used as a starting point for realizing embodiments herein. In NR, a reference signal may be periodic, semi-persistent, or aperiodic. A periodic reference signal is transmitted as long as the RRC configuration of the reference signal is valid. A semi-persistent reference signal is configured by an RRC IE, but its transmission is controlled by MAC CE signaling. An aperiodic reference signal is configured by an RRC IE, but its transmission is triggered by physical layer and/or layer 1 ("L1") signaling (e.g., a DCI message). In all those cases, the RRC configuration includes parameters indicating which resources are allocated to a reference signal, while the additional MAC CE or DCI signaling may further activate/deactivate or trigger a transmission of the reference signal.

In certain embodiments, a node that is configured as a receiving side of communications on a set of resources or a subset of a set of resources may listen to RS resources to perform an interference measurement. For a node to be considered as a receiving side of a resource, the node may be a child IAB-MT or a UE if the resource is downlink (or flexible), or a parent IAB-DU or a gNB if the resource is uplink (or flexible). Either alternatively or additionally, a resource may be considered based on whether it is a hard resource, a soft resource, or a soft resource that is indicated available by an availability indication ("AI") message. Particularly, a node may receive an RS and perform measurements on it if the RS is associated with a resource for which the node is configured as a receiving side and the resource is hard, soft, and/or soft and indicated available.

In some embodiments, if a node intends to perform measurements through multiple beams/spatial relations on an antenna/panel, the node may listen to multiple symbols associated with reference signal transmissions with 'repetition' set to 'on' (e.g., reference signals that are quasi-collocated ("QCL'ed") with respect to receive spatial parameters (e.g., Type D).

In various embodiments, a measurement may be performed on resources that are not necessarily configured for receiving a reference signal for a node. In this case, the node may measure a receive signal power and obtain a receive signal strength indicator ("RSSI") or the like.

With regard to interference measurement, the source and intensity of an interference may be different based on a duplexing/multiplexing case, hardware, a number of antenna panels, and so forth. For frequency-division multiplexing ("FDM"), a signal on a first frequency may cause an interference on a signal on a second frequency due to existence of sidelobes. This type of interference may be more severe if a node uses one antenna panel for multiple simultaneous operations.

For spatial-division multiplexing ("SDM"), a signal via a first beam/spatial setting may cause an interference on a signal via a second beam/spatial setting even if the corresponding operations are performed via multiple antenna panels. The cause of this type of interference may be lack of spatial separation between two beams/spatial settings, possibly further exacerbated by external objects/reflectors appearing or disappearing, mobility of the node, and so forth.

In certain embodiments, due to diverse types and causes of interference, an IAB-CU may configure embodiments described herein based on information such as an IAB node capability, a number of panels, a type of simultaneous operation (e.g., which may itself be determined by resource configurations and resource multiplexing), an IAB node mobility, a history of success or failure associated with a type of duplexing/multiplexing, or the like.

In some embodiments, a parent node or another local node may signal to execute one of the embodiments described herein based on information such as an IAB node capability, a number of panels, a type of simultaneous operation (e.g., which may itself be determined by resource configurations and resource multiplexing), an IAB node mobility, a history of success or failure associated with a type of duplexing/multiplexing, or the like.

In various embodiments, reference is made to time-overlapping ("TOL") resources such as TOL symbols, although a different term may be used for overlapping resources or they may be referred to as "same" resources. Moreover, TOL resources may be defined or configured for different entities, such as different IAB nodes, an IAB-MT and IAB-DU of an IAB node, and so forth. Further, for different numerologies a symbol in a first operation/configuration may not have the same length in time as a symbol in a second operation/configuration. In addition, a timing misalignment may be deliberate due to employing different timing alignments or due to an error.

In certain embodiments, it should be noted that TOL as a relationship between two resources is commutative—if a first resource/symbol A is time-overlapping with a second resource/symbol B, then B is also TOL with A. There may be a symbol in a first operation/configuration and a TOL symbol in a second operation/configuration.

In some embodiments, an "operation" may refer to a transmission ("TX") of a signal or a reception ("RX") of a signal. In this context, a simultaneous operation may refer to simultaneous transmissions, simultaneous receptions, or simultaneous transmissions and receptions by two communication entities. In various embodiments, two entities may belong to a same node such as an IAB node. In certain embodiments, two entities may be an IAB-MT and an IAB-DU of an IAB node.

Although embodiments herein may be described for symbols, such as OFDM symbols, as a unit of time resources, the methods may be extended to other units such as slots, mini-slots, subframes, a group of symbols such as all the DL, UL, or F symbols in a slot or a group of slots, and so forth. Furthermore, the methods may be extended to the frequency domain (with a unit of resource element, resource block, sub-channel, etc.) or other domains.

In various embodiments, a node N may serve multiple child nodes CN. Communication between a node N and a child node CN1 may demand applying a different beam (e.g., spatial parameters) from a beam for communication between the node N and another child node CN2. In this case, multiple reference signals ("RS") may be transmitted and/or received/measured for evaluating interference to/from the different child nodes.

In certain embodiments, a node N may be served by multiple parent nodes PN (e.g., in the case of dual connectivity ("DC") or other multi-parent scenarios). Communication between a node N and a parent node PN1 may demand applying a different beam (e.g., spatial parameters) from a beam for communication between the node N and another parent node PN2. In this case, multiple RS may be transmitted and/or received/measured for evaluating interference to/from the different parent nodes.

In some embodiments, a control signaling such as an NNBI signaling may be per node or per link. In various embodiments, a control signaling such as an NNBI signaling may be per node (e.g., a PN-N beam may be indicated suitable/available or unsuitable/unavailable for communication with any other node). For example, if a parent node PN indicates a beam as suitable/available (or unsuitable/unavailable, respectively) for a node N, then N may (or may not, respectively) indicate the beam for a communication with any child node CN.

In certain embodiments, a control signaling such as an NNBI signaling may be per link (e.g., a beam of N-CN1 link may be indicated suitable/unavailable or unsuitable/unavailable with another specific node CN1). For example, if a parent node PN indicates a beam as suitable/available (or unsuitable/unavailable, respectively) for a node N and for a child node CN1, then N may (or may not, respectively) indicate the beam for a communication with the specific child node CN1. This may be extended for a plurality of child nodes (e.g., multiple links) as well.

In some embodiments, the methods proposed herein may be applied to multiple enhanced IAB nodes and legacy IAB nodes. In this case, the configurations for the legacy IAB nodes may be compatible with legacy configurations (e.g., reference signal configurations, measurement and reporting configurations, and so forth), while the enhanced configuration and signaling proposed in this disclosure may be adopted in the enhanced IAB node to improve efficiency by implicit signaling (e.g., beam indication, power control indication, timing alignment indication, and so forth) that the proposed methods may require.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}: 3) 'QCL-TypeC': {Doppler shift, average delay}: and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mm Wave, frequency range 2 ("FR2"), and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

In various embodiments described herein, although entities are referred to as IAB nodes, the same embodiments can be applied to IAB donors (e.g., which are the IAB entities connecting the core network to the IAB network) with minimum or zero modifications. Moreover, different steps described for different embodiments may be permuted. Further, each configuration may be provided by one or more configurations in practice. An earlier configuration may provide a subset of parameters while a later configuration may provide another subset of parameters. In certain embodiments, a later configuration may override values provided by an earlier configuration or a pre-configuration.

In some embodiments, a configuration may be provided by radio resource control ("RRC") signaling, medium-access control ("MAC") signaling, physical layer signaling such as a downlink control information ("DCI") message, a combination thereof, or other methods. A configuration may include a pre-configuration or a semi-static configuration provided by a standard, by a vendor, and/or by a network and/or operator. Each parameter value received through configuration or indication may override previous values for a similar parameter.

In various embodiments, despite frequent references to IAB, embodiments herein may be applicable to wireless relay nodes and other types of wireless communication entities. Further, layer 1 ("L1") and/or layer 2 ("L2") control signaling may refer to control signaling in layer 1 (e.g., physical layer) or layer 2 (e.g., data link layer). Particularly, an L1 and/or L2 control signaling may refer to an L1 control signaling such as a DCI message or an uplink control information ("UCI") message, an L2 control signaling such as a MAC message, or a combination thereof. A format and an interpretation of an L1 and/or L2 control signaling may be determined by a standard, a configuration, other control signaling, or a combination thereof.

It should be noted that any parameter discussed in this disclosure may appear, in practice, as a linear function of that parameter in signaling or specifications.

In various embodiments, vendor manufacturing IAB systems and/or devices and an operator deploying the IAB systems and/or devices may be allowed to negotiate capabilities of the systems and/or devices. This may mean that some of the information assumed to need signaling between entities may readily be available to the devices, for example, by storing the information on a memory unit such as a read-only memory ("ROM"), exchanging the information by proprietary signaling methods, providing the information by a (pre)configuration, or otherwise taking the information into account when creating hardware and/or software of the IAB systems and/or devices or other entities in the network. In certain embodiments, embodiments described herein that include exchanging information may be extended to similar embodiments wherein the information is obtained by other embodiments.

Further, embodiments used for an IAB mobile terminal ("MT") ("IAB-MT") may be adopted by a UE as well. If an embodiment uses a capability that is not supported by a legacy UE, a UE enhanced to possess the capability may be used. In this case, the UE may be referred to as an enhanced UE or an IAB-enhanced UE and may convey its information of its enhanced capability to the network for proper configuration and operation.

As used herein, a node or a wireless node may refer to an IAB node, an IAB-DU, an IAB-MT, a UE, a base station ("BS"), a gNodeB ("gNB"), a transmit-receive point ("TRP"), an IAB donor, and so forth. The embodiments herein with an emphasis on a type of nodes are not meant to limit scope.

In certain embodiments, may be used to perform measurements for beam training on reference signals. In some embodiments, a measurement may be performed on resources that are not necessarily configured for reference signals, but rather a node may measure a receive signal power and obtain a RSSI or the like.

In various embodiments, phrases such as Case C or Case D multiplexing are just a matter of nomenclature. Instead, a Case C multiplexing may be identified by an uplink transmission by a node's IAB-MT and an uplink reception by a node's IAB-DU. Similarly, a Case D multiplexing may be identified by a downlink reception by a node's IAB-MT and a downlink transmission by a node's IAB-DU. In general, depending on node capabilities such as multi-panel and/or full-duplex capabilities of an IAB node, one or more of the defined multiplexing cases may be operational at a given moment. For example, if an IAB node transmits an uplink signal to parent node while transmitting to and receiving signals from child nodes, the IAB node may be performing Case A and Case C multiplexing simultaneously. It should be, hence, noted that the methods described herein are not bound to specific multiplexing cases. Different steps/elements explained in the proposed methods may be mixed and matched to realize different multiplexing cases without an explicit mention of how the information obtained by measurements and signaling may be used.

In certain embodiments, reference is made to beam indication. In practice, a beam indication may refer to an indication of a reference signal by an ID or indicator, a resource associated with a reference signal, a spatial relation information comprising information of a reference signal, or a reciprocal of a reference signal (e.g., for beam correspondence).

As used herein, "HARQ-ACK" may represent collectively the positive acknowledge ("ACK") and the negative acknowledge ("NACK" or "NAK"). ACK means that a transport block ("TB") is correctly received while NACK (or NAK) means a TB is erroneously received.

Figure 23:
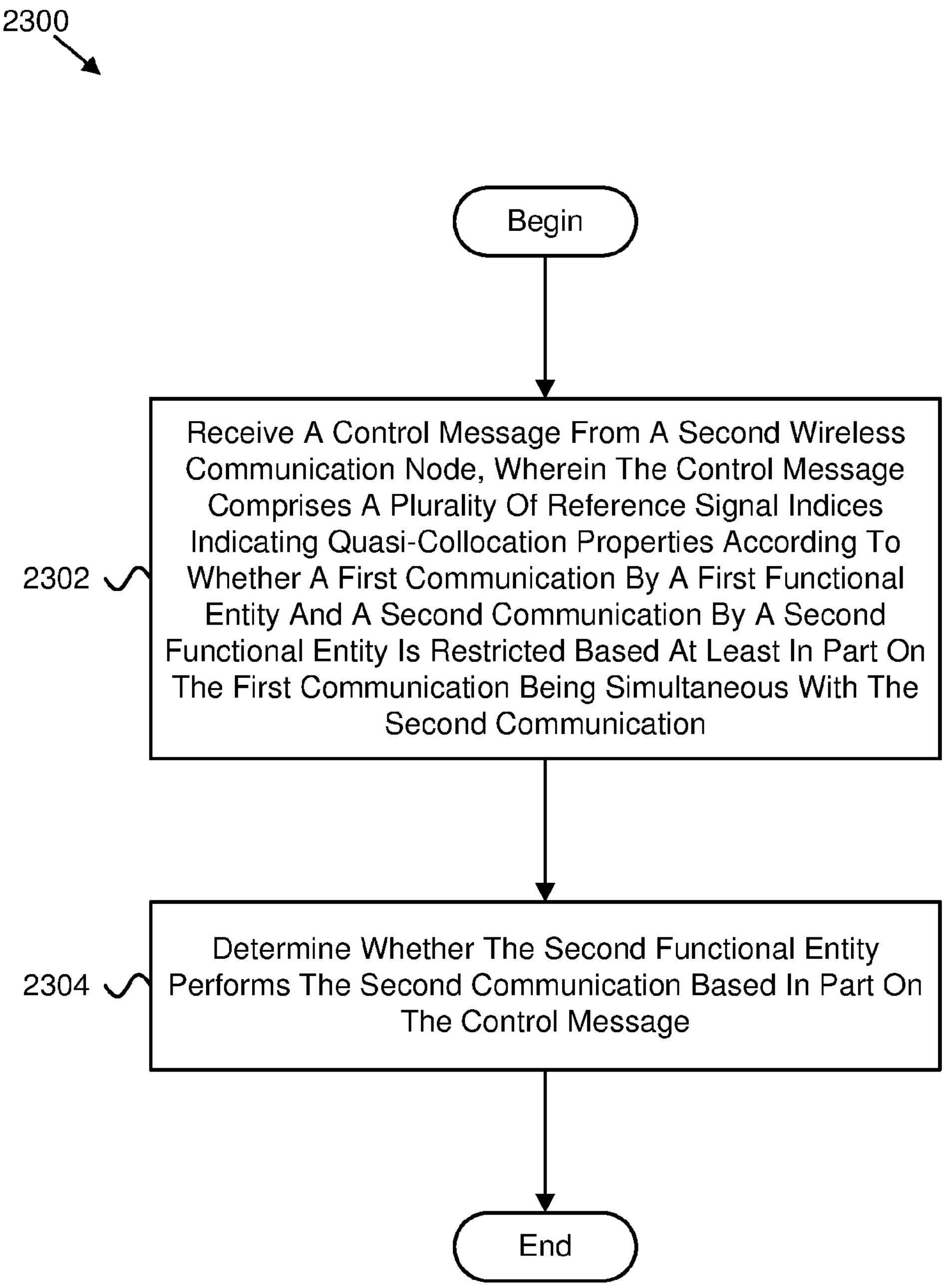
FIG. 23 is a flow chart diagram illustrating one embodiment of a method for communicating based on quasi-collocation properties.

FIG. 23 is a flow chart diagram illustrating one embodiment of a method 2300 for communicating based on quasi-collocation properties. In some embodiments, the method 2300 is performed by an apparatus, such as the network unit 104. In certain embodiments, the method 2300 may be performed by a processor executing program code, for example, a microcontroller, a microprocessor, a CPU, a GPU, an auxiliary processing unit, a FPGA, or the like.

In various embodiments, the method 2300 includes receiving 2302, at a first wireless communication node, a control message from a second wireless communication node. The control message includes a plurality of reference signal indices indicating quasi-collocation properties according to whether a first communication by a first functional entity and a second communication by a second functional entity is restricted based at least in part on the first communication being simultaneous with the second communication. In some embodiments, the method 2300 includes determining 2304 whether the second functional entity performs the second communication based in part on the control message.

In certain embodiments: an integrated access and backhaul central unit (IAB-CU) configures the first wireless communication node with a plurality of reference signals associated with the plurality of the reference signal indices: and the IAB-CU indicates information of the plurality of reference signals, the plurality of reference signal indices, or a combination thereof to the second wireless communication node over an F1 interface. In some embodiments, the first wireless communication node comprises an integrated access and backhaul (IAB) node. In various embodiments, the second wireless communication node comprises a parent node of the first wireless communication node.

In one embodiment, the control message comprises a downlink control indication (DCI) message, a medium access control (MAC) control element (CE) message, or a combination thereof. In certain embodiments, the quasi-collocation properties comprise a quasi-collocation with respect to a spatial receive (RX) parameter, a quasi-collocation (QCL) Type D, a spatial quasi-collocation, or some combination thereof. In some embodiments, the first functional entity comprises an integrated access and backhaul mobile terminal (IAB-MT).

In various embodiments, the second functional entity comprises an integrated access and backhaul distributed unit (IAB-DU). In one embodiment, the first wireless communication node comprises the first functional entity and the second functional entity. In certain embodiments: the first communication comprises a first transmission, a first reception, or a combination thereof; and the second communication comprises a second transmission, a second reception, or a combination thereof.

In some embodiments, determining whether the second functional entity performs the second communication comprises determining whether the first wireless communication node is configured a multiplexing case not constrained to time-division multiplexing (TDM) while using at least one reference signal index in the plurality of the reference signal indices. In various embodiments: the multiplexing case is configured by an integrated access and backhaul central unit (IAB-CU): and the multiplexing case is indicated to the first wireless communication node over an F1 interface. In one embodiment, the multiplexing case comprises: the first communication being a reception and the second communication being a reception: the first communication being a transmission and the second communication being a transmission: the first communication being a transmission and the second communication being a reception: the first communication being a reception and the second communication being a transmission: or some combination thereof.

In certain embodiments, determining whether the second functional entity performs the second communication comprises determining whether a resource on which to perform the second communication is configured as a soft resource and the resource is indicated available by an availability indication. In some embodiments, the availability indication is provided by the second wireless communication node. In various embodiments, the resource comprises a symbol, a resource block (RB), a group of resource blocks, or some combination thereof.

In one embodiment, the method 2300 further comprises receiving a plurality of transmission configuration indicator (TCI) states, reference signal resource indicators, or a combination thereof associated with the second functional entity, wherein: determining whether the second functional entity performs the second communication comprises determining whether at least one TCI state in the plurality of TCI states, one reference signal resource indicator in the plurality of reference signal resource indicators, or a combination thereof is used for the first communication. In certain embodiments, the one reference signal resource indicator comprises a channel state information reference signal (CSI-RS) resource indicator (CRI), a synchronization signal block resource indicator (SSBRI), a sounding reference signal (SRS) resource indicator (SRI), or some combination thereof.

In some embodiments, determining whether the second functional entity performs the second communication comprises determining whether the first communication and the second communication are performed on overlapping resources. In various embodiments, the overlapping resources comprise overlapping symbols, overlapping resource blocks (RBs), or overlapping groups of resource blocks.

Figure 24:
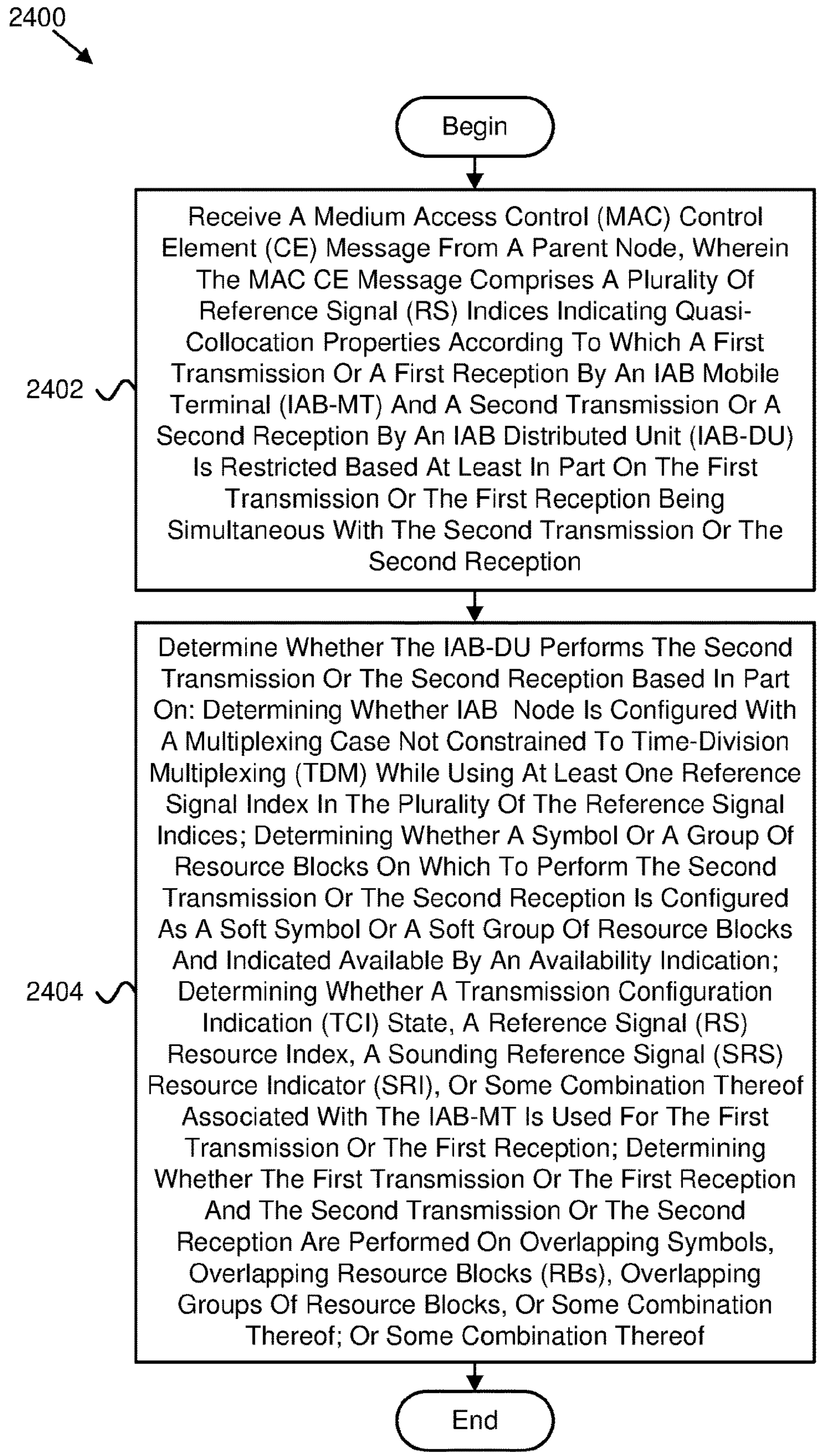
FIG. 24 is a flow chart diagram illustrating another embodiment of a method for communicating based on quasi-collocation properties.

FIG. 24 is a flow chart diagram illustrating another embodiment of a method 2400 for communicating based on quasi-collocation properties. In some embodiments, the method 2400 is performed by an apparatus, such as the network unit 104. In certain embodiments, the method 2400 may be performed by a processor executing program code, for example, a microcontroller, a microprocessor, a CPU, a GPU, an auxiliary processing unit, a FPGA, or the like.

In various embodiments, the method 2400 includes receiving 2402, at an integrated access and backhaul (IAB) node, a medium access control (MAC) control element (CE) message from a parent node. The MAC CE message includes a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception. In various embodiments, the method 2400 includes determining 2404 whether the IAB-DU performs the second transmission or the second reception based in part on: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof: or some combination thereof.

In certain embodiments, the control message comprises a downlink control indication (DCI) message, a medium access control (MAC) control element (CE) message, or a combination thereof. In some embodiments, the quasi-collocation properties comprise a quasi-collocation with respect to a spatial receive (RX) parameter, a quasi-collocation (QCL) Type D, a spatial quasi-collocation, or some combination thereof. In various embodiments: the multiplexing case is configured by an integrated access and backhaul central unit (IAB-CU): and the multiplexing case is indicated to the IAB node over an F1 interface.

In one embodiment, an apparatus comprising a first wireless communication node. The first wireless communication node further comprising: a receiver that receives a control message from a second wireless communication node, wherein the control message comprises a plurality of reference signal indices indicating quasi-collocation properties according to whether a first communication by a first functional entity and a second communication by a second functional entity is restricted based at least in part on the first communication being simultaneous with the second communication: and a processor that determines whether the second functional entity performs the second communication based in part on the control message.

In certain embodiments: an integrated access and backhaul central unit (IAB-CU) configures the first wireless communication node with a plurality of reference signals associated with the plurality of the reference signal indices: and the IAB-CU indicates information of the plurality of reference signals, the plurality of reference signal indices, or a combination thereof to the second wireless communication node over an F1 interface.

In some embodiments, the first wireless communication node comprises an integrated access and backhaul (IAB) node.

In various embodiments, the second wireless communication node comprises a parent node of the first wireless communication node.

In one embodiment, the control message comprises a downlink control indication (DCI) message, a medium access control (MAC) control element (CE) message, or a combination thereof.

In certain embodiments, the quasi-collocation properties comprise a quasi-collocation with respect to a spatial receive (RX) parameter, a quasi-collocation (QCL) Type D, a spatial quasi-collocation, or some combination thereof.

In some embodiments, the first functional entity comprises an integrated access and backhaul mobile terminal (IAB-MT).

In various embodiments, the second functional entity comprises an integrated access and backhaul distributed unit (IAB-DU).

In one embodiment, the first wireless communication node comprises the first functional entity and the second functional entity.

In certain embodiments: the first communication comprises a first transmission, a first reception, or a combination thereof: and the second communication comprises a second transmission, a second reception, or a combination thereof.

In some embodiments, the processor determining whether the second functional entity performs the second communication comprises the processor determining whether the first wireless communication node is configured a multiplexing case not constrained to time-division multiplexing (TDM) while using at least one reference signal index in the plurality of the reference signal indices.

In various embodiments: the multiplexing case is configured by an integrated access and backhaul central unit (IAB-CU): and the multiplexing case is indicated to the first wireless communication node over an F1 interface.

In one embodiment, the multiplexing case comprises: the first communication being a reception and the second communication being a reception: the first communication being a transmission and the second communication being a transmission: the first communication being a transmission and the second communication being a reception: the first communication being a reception and the second communication being a transmission: or some combination thereof.

In certain embodiments, the processor determining whether the second functional entity performs the second communication comprises the processor determining whether a resource on which to perform the second communication is configured as a soft resource and the resource is indicated available by an availability indication.

In some embodiments, the availability indication is provided by the second wireless communication node.

In various embodiments, the resource comprises a symbol, a resource block (RB), a group of resource blocks, or some combination thereof.

In one embodiment, the receiver receives a plurality of transmission configuration indicator (TCI) states, reference signal resource indicators, or a combination thereof associated with the second functional entity, wherein: the processor determining whether the second functional entity performs the second communication comprises the processor determining whether at least one TCI state in the plurality of TCI states, one reference signal resource indicator in the plurality of reference signal resource indicators, or a combination thereof is used for the first communication.

In certain embodiments, the one reference signal resource indicator comprises a channel state information reference signal (CSI-RS) resource indicator (CRI), a synchronization signal block resource indicator (SSBRI), a sounding reference signal (SRS) resource indicator (SRI), or some combination thereof.

In some embodiments, the processor determining whether the second functional entity performs the second communication comprises the processor determining whether the first communication and the second communication are performed on overlapping resources.

In various embodiments, the overlapping resources comprise overlapping symbols, overlapping resource blocks (RBs), or overlapping groups of resource blocks.

In one embodiment, a method in a first wireless communication node comprises: receiving a control message from a second wireless communication node, wherein the control message comprises a plurality of reference signal indices indicating quasi-collocation properties according to whether a first communication by a first functional entity and a second communication by a second functional entity is restricted based at least in part on the first communication being simultaneous with the second communication: and determining whether the second functional entity performs the second communication based in part on the control message.

In certain embodiments: an integrated access and backhaul central unit (IAB-CU) configures the first wireless communication node with a plurality of reference signals associated with the plurality of the reference signal indices: and the IAB-CU indicates information of the plurality of reference signals, the plurality of reference signal indices, or a combination thereof to the second wireless communication node over an F1 interface.

In some embodiments, the first wireless communication node comprises an integrated access and backhaul (IAB) node.

In various embodiments, the second wireless communication node comprises a parent node of the first wireless communication node.

In one embodiment, the control message comprises a downlink control indication (DCI) message, a medium access control (MAC) control element (CE) message, or a combination thereof.

In certain embodiments, the quasi-collocation properties comprise a quasi-collocation with respect to a spatial receive (RX) parameter, a quasi-collocation (QCL) Type D, a spatial quasi-collocation, or some combination thereof.

In some embodiments, the first functional entity comprises an integrated access and backhaul mobile terminal (IAB-MT).

In various embodiments, the second functional entity comprises an integrated access and backhaul distributed unit (IAB-DU).

In one embodiment, the first wireless communication node comprises the first functional entity and the second functional entity.

In certain embodiments: the first communication comprises a first transmission, a first reception, or a combination thereof: and the second communication comprises a second transmission, a second reception, or a combination thereof.

In some embodiments, determining whether the second functional entity performs the second communication comprises determining whether the first wireless communication node is configured a multiplexing case not constrained to time-division multiplexing (TDM) while using at least one reference signal index in the plurality of the reference signal indices.

In various embodiments: the multiplexing case is configured by an integrated access and backhaul central unit (IAB-CU): and the multiplexing case is indicated to the first wireless communication node over an F1 interface.

In one embodiment, the multiplexing case comprises: the first communication being a reception and the second communication being a reception: the first communication being a transmission and the second communication being a transmission: the first communication being a transmission and the second communication being a reception: the first communication being a reception and the second communication being a transmission: or some combination thereof.

In certain embodiments, determining whether the second functional entity performs the second communication comprises determining whether a resource on which to perform the second communication is configured as a soft resource and the resource is indicated available by an availability indication.

In some embodiments, the availability indication is provided by the second wireless communication node.

In various embodiments, the resource comprises a symbol, a resource block (RB), a group of resource blocks, or some combination thereof.

In one embodiment, the method further comprises receiving a plurality of transmission configuration indicator (TCI) states, reference signal resource indicators, or a combination thereof associated with the second functional entity, wherein: determining whether the second functional entity performs the second communication comprises determining whether at least one TCI state in the plurality of TCI states, one reference signal resource indicator in the plurality of reference signal resource indicators, or a combination thereof is used for the first communication.

In certain embodiments, the one reference signal resource indicator comprises a channel state information reference signal (CSI-RS) resource indicator (CRI), a synchronization signal block resource indicator (SSBRI), a sounding reference signal (SRS) resource indicator (SRI), or some combination thereof.

In some embodiments, determining whether the second functional entity performs the second communication comprises determining whether the first communication and the second communication are performed on overlapping resources.

In various embodiments, the overlapping resources comprise overlapping symbols, overlapping resource blocks (RBs), or overlapping groups of resource blocks.

In one embodiment, an apparatus comprises an integrated access and backhaul (IAB) node. The IAB node further comprises: a receiver that receives a medium access control (MAC) control element (CE) message from a parent node, wherein the MAC CE message comprises a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception: and a processor that determines whether the IAB-DU performs the second transmission or the second reception based in part on the processor; determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof: or some combination thereof.

In certain embodiments, the control message comprises a downlink control indication (DCI) message, a medium access control (MAC) control element (CE) message, or a combination thereof.

In some embodiments, the quasi-collocation properties comprise a quasi-collocation with respect to a spatial receive (RX) parameter, a quasi-collocation (QCL) Type D, a spatial quasi-collocation, or some combination thereof.

In various embodiments: the multiplexing case is configured by an integrated access and backhaul central unit (IAB-CU): and the multiplexing case is indicated to the IAB node over an F1 interface.

In one embodiment, a method in an integrated access and backhaul (IAB) node comprises: receiving a medium access control (MAC) control element (CE) message from a parent node, wherein the MAC CE message comprises a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception: and determining whether the IAB-DU performs the second transmission or the second reception based in part on: determining whether IAB node is configured with a multiplexing case not constrained to time-division multiplexing (TDM) while using at least one reference signal index in the plurality of the reference signal indices: determining whether a symbol or a group of resource blocks on which to perform the second transmission or the second reception is configured as a soft symbol or a soft group of resource blocks and indicated available by an availability indication: determining whether a transmission configuration indication (TCI) state, a reference signal (RS) resource index, a sounding reference signal (SRS) resource indicator (SRI), or some combination thereof associated with the IAB-MT is used for the first transmission or the first reception: determining whether the first transmission or the first reception and the second transmission or the second reception are performed on overlapping symbols, overlapping resource blocks (RBs), overlapping groups of resource blocks, or some combination thereof; or some combination thereof.

In certain embodiments, the control message comprises a downlink control indication (DCI) message, a medium access control (MAC) control element (CE) message, or a combination thereof.

In some embodiments, the quasi-collocation properties comprise a quasi-collocation with respect to a spatial receive (RX) parameter, a quasi-collocation (QCL) Type D, a spatial quasi-collocation, or some combination thereof.

In various embodiments: the multiplexing case is configured by an integrated access and backhaul central unit (IAB-CU): and the multiplexing case is indicated to the IAB node over an F1 interface.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for performing a network function, the apparatus comprising:
- at least one memory; and
- at least one processor coupled with the at least one memory and configured to cause the apparatus to:
  - receive, at a first wireless communication node, a control message from a second wireless communication node, wherein the control message comprises a plurality of reference signal indices indicating quasi-collocation properties according to whether a first communication by a first functional entity and a second communication by a second functional entity is restricted based at least in part on the first communication being simultaneous with the second communication; and
  - determine whether the second functional entity performs the second communication based in part on a simultaneous communication of the first communication by the first functional entity and the second communication by the second functional entity being restricted, as indicated by the plurality of reference signal indices.

2. The apparatus of claim 1, wherein:
- an integrated access and backhaul central unit (IAB-CU) configures the first wireless communication node with a plurality of reference signals associated with the plurality of the reference signal indices; and
- the IAB-CU indicates information of the plurality of reference signals, the plurality of reference signal indices, or a combination thereof to the second wireless communication node over an F1 interface.

3. The apparatus of claim 1, wherein the first wireless communication node comprises an integrated access and backhaul (IAB) node and the second wireless communication node comprises a parent node of the first wireless communication node.

4. The apparatus of claim 1, wherein the control message comprises a downlink control indication (DCI) message, a medium access control (MAC) control element (CE) message, or a combination thereof.

5. The apparatus of claim 1, wherein the quasi-collocation properties comprise a quasi-collocation with respect to a spatial receive (RX) parameter, a quasi-collocation (QCL) Type D, a spatial quasi-collocation, or a combination thereof.

6. The apparatus of claim 1, wherein the first functional entity comprises an integrated access and backhaul mobile terminal (IAB-MT).

7. The apparatus of claim 1, wherein the second functional entity comprises an integrated access and backhaul distributed unit (IAB-DU).

8. The apparatus of claim 1, wherein the first wireless communication node comprises the first functional entity and the second functional entity.

9. The apparatus of claim 1, wherein:
- the first communication comprises a first transmission, a first reception, or a combination thereof; and
- the second communication comprises a second transmission, a second reception, or a combination thereof.

10. The apparatus of claim 1, wherein the at least one processor is configured to cause the apparatus to determine whether the first wireless communication node is configured a multiplexing case not constrained to time-division multiplexing (TDM) while using at least one reference signal index in the plurality of the reference signal indices.

11. The apparatus of claim 1, wherein the at least one processor is configured to cause the apparatus to determine whether a resource on which to perform the second communication is configured as a soft resource and the resource is indicated available by an availability indication.

12. The apparatus of claim 1, wherein the at least one processor is configured to cause the apparatus to:
- receive a plurality of transmission configuration indicator (TCI) states, reference signal resource indicators, or a combination thereof associated with the second functional entity; and
- determine whether at least one TCI state in the plurality of TCI states, one reference signal resource indicator in the plurality of reference signal resource indicators, or a combination thereof is used for the first communication.

13. The apparatus of claim 1, wherein the at least one processor is configured to cause the apparatus to determine whether the first communication and the second communication are performed on overlapping resources.

14. A method of performing a network function, the method comprising:
- receiving, at a first wireless communication node, a control message from a second wireless communication node, wherein the control message comprises a plurality of reference signal indices indicating quasi-collocation properties according to whether a first communication by a first functional entity and a second communication by a second functional entity is restricted based at least in part on the first communication being simultaneous with the second communication; and
- determining whether the second functional entity performs the second communication based in part on a simultaneous communication of the first communication by the first functional entity and the second communication by the second functional entity being restricted, as indicated by the plurality of reference signal indices.

15. An apparatus for performing a network function, the apparatus comprising:
- at least one memory; and
- at least one processor coupled with the at least one memory and configured to cause the apparatus to:
  - receive, at an integrated access and backhaul (IAB) node, a medium access control (MAC) control element (CE) message from a parent node, wherein the MAC CE message comprises a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception; and determine whether the IAB-DU performs the second transmission or the second reception according to a simultaneous communication of a first transmission or a first reception by the IAB-MT and the second transmission or the second reception by the IAB-DU being restricted, as indicated by the plurality of reference signal indices and based in part on the at least one processor being configured to cause the apparatus to:

determine whether the IAB node is configured with a multiplexing case not constrained to time-division multiplexing (TDM) while using at least one reference signal index in the plurality of the reference signal indices;

determine whether a symbol or a group of resource blocks on which to perform the second transmission or the second reception is configured as a soft symbol or a soft group of resource blocks and indicated available by an availability indication;

determine whether a transmission configuration indication (TCI) state, a reference signal (RS) resource index, a sounding reference signal (SRS) resource indicator (SRI), or a combination thereof associated with the IAB-MT is used for the first transmission or the first reception;

determine whether the first transmission or the first reception and the second transmission or the second reception are performed on overlapping symbols, overlapping resource blocks (RBs), overlapping groups of resource blocks, or a combination thereof;

or a combination thereof.

16. A method of performing a network function, the method comprising:

receiving, at an integrated access and backhaul (IAB) node, a medium access control (MAC) control element (CE) message from a parent node, wherein the MAC CE message comprises a plurality of reference signal (RS) indices indicating quasi-collocation properties according to which a first transmission or a first reception by an IAB mobile terminal (IAB-MT) and a second transmission or a second reception by an IAB distributed unit (IAB-DU) is restricted based at least in part on the first transmission or the first reception being simultaneous with the second transmission or the second reception; and determining whether the IAB-DU performs the second transmission or the second reception based in part on a simultaneous communication of a first transmission or a first reception by the IAB-MT and the second transmission or the second reception by the IAB-DU being restricted, as indicated by the plurality of reference signal indices and based in part on:

determining whether the IAB node is configured with a multiplexing case not constrained to time-division multiplexing (TDM) while using at least one reference signal index in the plurality of the reference signal indices;

determining whether a symbol or a group of resource blocks on which to perform the second transmission or the second reception is configured as a soft symbol or a soft group of resource blocks and indicated available by an availability indication;

determining whether a transmission configuration indication (TCI) state, a reference signal (RS) resource index, a sounding reference signal (SRS) resource indicator (SRI), or a combination thereof associated with the IAB-MT is used for the first transmission or the first reception;

determining whether the first transmission or the first reception and the second transmission or the second reception are performed on overlapping symbols, overlapping resource blocks (RBs), overlapping groups of resource blocks, or a combination thereof;

or a combination thereof.

17. The method of claim 14, wherein:

an integrated access and backhaul central unit (IAB-CU) configures the first wireless communication node with a plurality of reference signals associated with the plurality of the reference signal indices; and the IAB-CU indicates information of the plurality of reference signals, the plurality of reference signal indices, or a combination thereof to the second wireless communication node over an F1 interface.

18. The method of claim 14, wherein the first wireless communication node comprises an integrated access and backhaul (IAB) node and the second wireless communication node comprises a parent node of the first wireless communication node.

19. The method of claim 14, wherein the control message comprises a downlink control indication (DCI) message, a medium access control (MAC) control element (CE) message, or a combination thereof.

20. The method of claim 14, wherein the quasi-collocation properties comprise a quasi-collocation with respect to a spatial receive (RX) parameter, a quasi-collocation (QCL) Type D, a spatial quasi-collocation, or a combination thereof.

* * * * *